US008724502B2

(12) United States Patent
Sugiyama et al.

(10) Patent No.: US 8,724,502 B2
(45) Date of Patent: May 13, 2014

(54) COMPUTER PRODUCT, TESTING APPARATUS, AND TESTING METHOD

(75) Inventors: Taichi Sugiyama, Kawasaki (JP); Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 13/532,873

(22) Filed: Jun. 26, 2012

(65) Prior Publication Data
US 2013/0039189 A1  Feb. 14, 2013

(30) Foreign Application Priority Data

Aug. 11, 2011  (JP) .................... 2011-176348

(51) Int. Cl.
*H04L 12/26* (2006.01)

(52) U.S. Cl.
USPC ...... 370/252; 370/241; 370/255; 370/395.54; 370/401; 370/412; 709/223; 709/224

(58) Field of Classification Search
USPC ............ 370/241, 242, 252, 254, 255, 395.53, 370/395.54, 401; 709/203, 223–224, 709/244–245
See application file for complete search history.

(56) References Cited

U.S. PATENT DOCUMENTS

| 6,023,724 | A  | * | 2/2000  | Bhatia et al. ................ 709/218 |
| 7,372,861 | B2 | * | 5/2008  | Tomizawa .................... 370/401 |
| 7,400,591 | B2 | * | 7/2008  | Brawn et al. ................. 370/254 |
| 8,078,923 | B2 | * | 12/2011 | Nagadomi et al. ........... 714/706 |
| 8,280,996 | B2 | * | 10/2012 | Lu et al. ...................... 709/223 |
| 8,355,397 | B2 | * | 1/2013  | Arai et al. .................... 370/389 |
| 8,380,876 | B2 | * | 2/2013  | Ohkita ......................... 709/245 |
| 2005/0013255 | A1 | * | 1/2005  | Knop et al. .................... 370/241 |
| 2009/0070448 | A1 | * | 3/2009  | Pearson et al. ................ 709/223 |
| 2011/0153938 | A1 | * | 6/2011  | Verzunov et al. ............. 711/118 |
| 2011/0228684 | A1 |   | 9/2011  | Sugiyama et al. |
| 2012/0131192 | A1 | * | 5/2012  | MacCarthaigh et al. ..... 709/226 |

FOREIGN PATENT DOCUMENTS

| JP | 11-220487   | A  | 8/1999 |
| JP | 2000-253008 | A  | 9/2000 |
| JP | 2006-119867 | A1 | 5/2006 |
| WO | WO-2005-033908 | A2 | 4/2005 |
| WO | WO-2005-033908 | A3 | 4/2005 |

OTHER PUBLICATIONS

Hubbard, K. et al, "Internet Registry IP Allocation Guidelines," Nov. 1, 1996, Network Working Group Request for Comments, Best Current Practice, pp. 1-13, XP015007834.
Extended European Search Report dated Nov. 19, 2013 for corresponding European Application No. 12173365.3.

* cited by examiner

Primary Examiner — Candal Elpenord
(74) Attorney, Agent, or Firm — Fujitsu Patent Center

(57) ABSTRACT

A computer-readable medium stores a testing program that causes a computer having a storage device storing netmask lengths and address block utilization information associated with address blocks, to execute a process that includes acquiring first packets transmitted to a first apparatus, first addresses being regarded as transmission sources; referring to the storage device and acquiring a count of address blocks to which the first addresses belong and a netmask length; calculating based on the acquired address block count and netmask length, the netmask length less a bit count according to the number of the first addresses; referring to the storage device and selecting from among unused address blocks, an address block having a netmask length less than or equal to the calculated netmask length; and transmitting to a second apparatus, second packets obtained by setting the transmission sources of the first packets to second addresses in the selected address block.

7 Claims, 30 Drawing Sheets

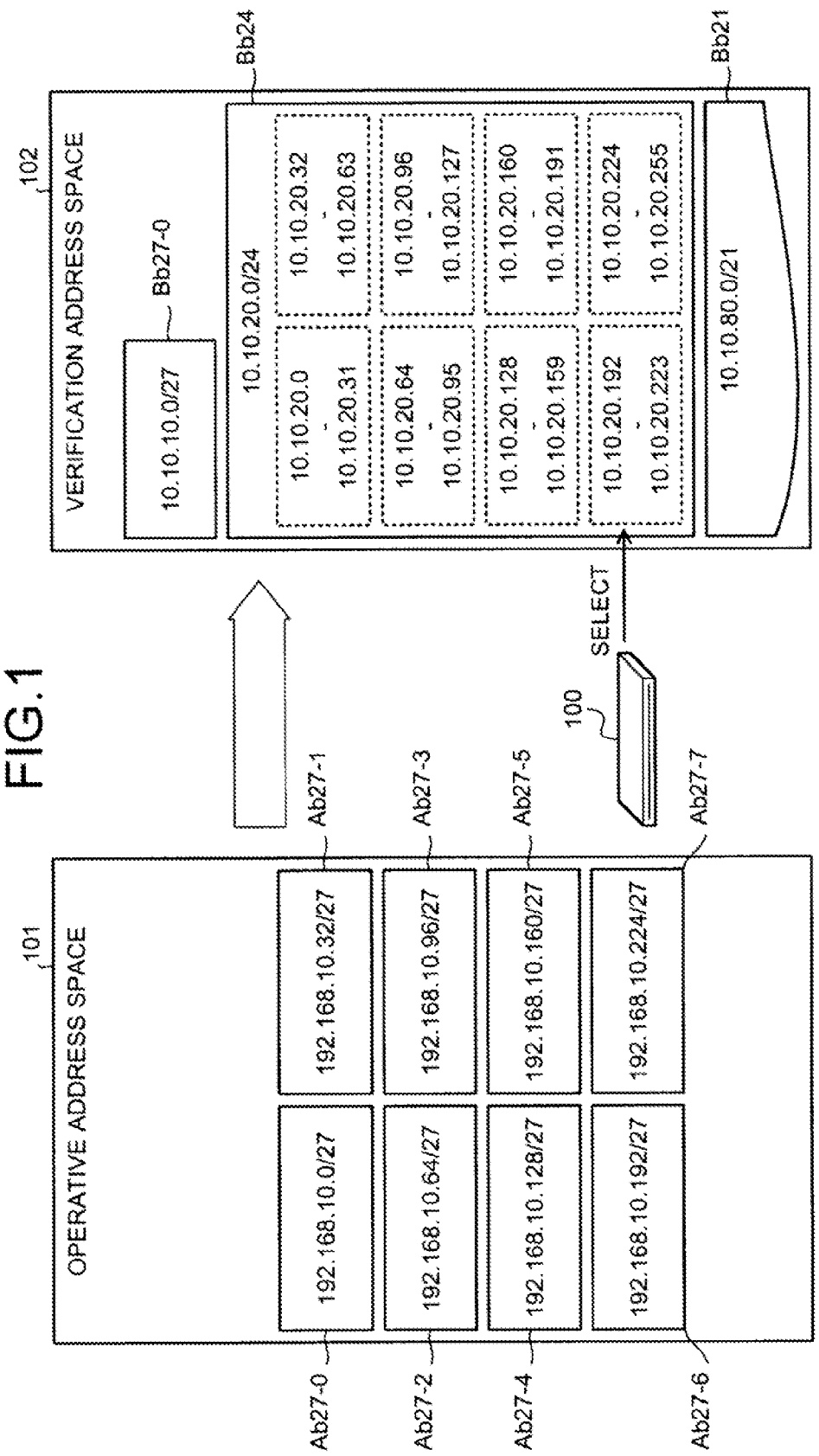

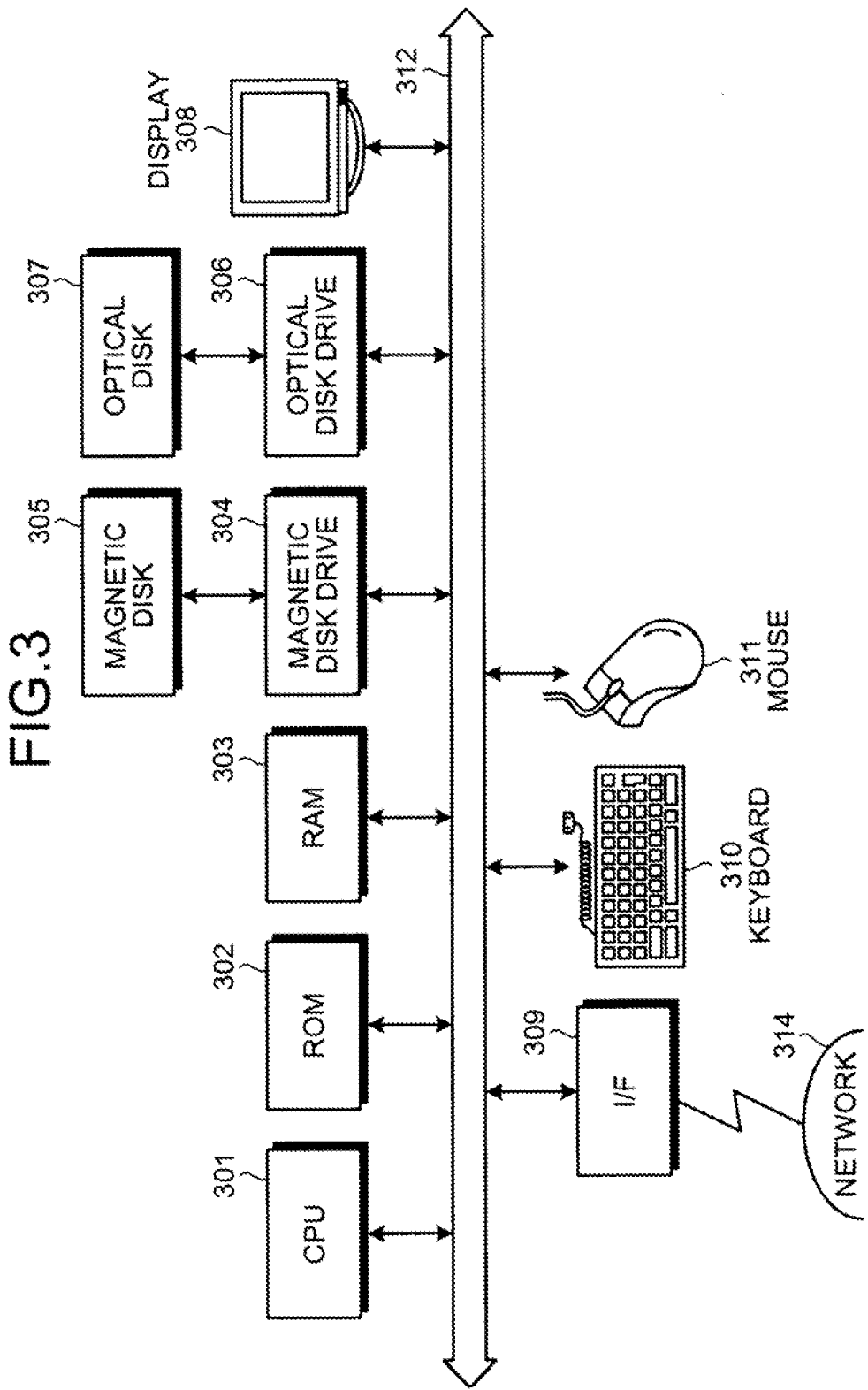

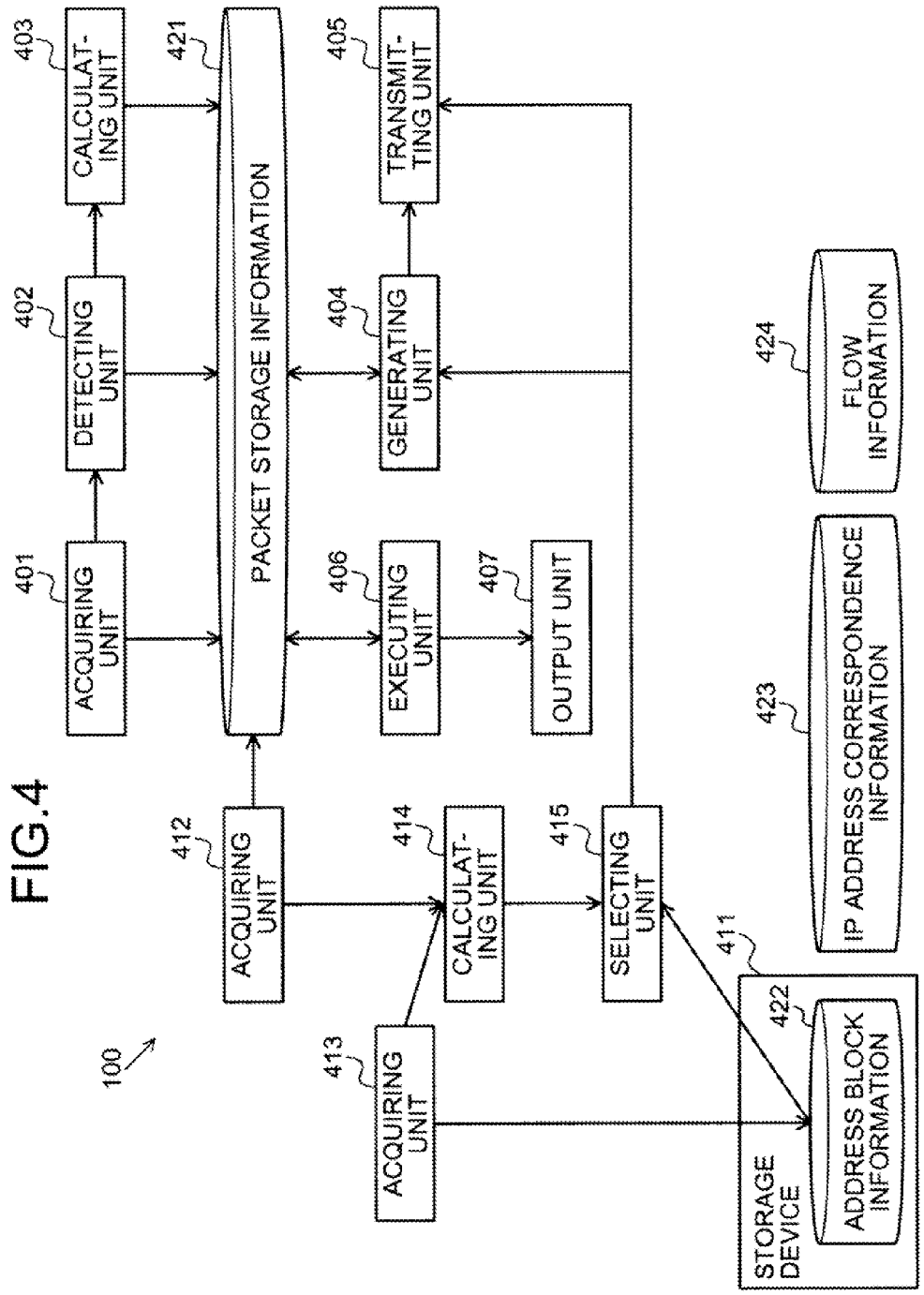

FIG. 5

| | | TIME INFORMATION | | IP HEADER INFORMATION | | TCP HEADER INFORMATION | | | | | | | | | APPLICATION HEADER INFORMATION | PAYLOAD |
|---|---|---|---|---|---|---|---|---|---|---|---|---|---|---|---|---|
| | SESSION ID | PERIOD | RTT | TRANSMISSION SOURCE IP | DESTINATION IP | TRANSMISSION SOURCE PORT | DESTINATION PORT | SEQUENCE NUMBER | CONFIRMATION RESPONSE NUMBER | SYN | ACK | PSH | FIN | RST | HTTP | |
| 421-1 | abc | 0 | | 192.168.10.2 | 20.20.20.20 | 2000 | 80 | 1000 | | 1 | - | - | - | - | - | - |
| 421-2 | abc | 0.3 | 0.3 | 20.20.20.20 | 192.168.10.2 | 80 | 2000 | 2000 | 1001 | 1 | 1 | - | - | - | - | - |
| 421-3 | abc | 0.4 | | 192.168.10.2 | 20.20.20.20 | 2000 | 80 | 1001 | 2001 | - | 1 | - | - | - | - | - |
| 421-4 | abc | 2.1 | | 192.168.10.2 | 20.20.20.20 | 2000 | 80 | 1001 | 2001 | - | 1 | 1 | - | - | GET | |
| 421-5 | abc | 2.3 | 0.2 | 20.20.20.20 | 192.168.10.2 | 80 | 2000 | 2001 | 3001 | - | 1 | - | - | - | - | |
| 421-6 | abc | 2.4 | | 20.20.20.20 | 192.168.10.2 | 80 | 2000 | 2001 | 3001 | - | 1 | - | - | - | - | |
| 421-7 | abc | 2.6 | 0.2 | 192.168.10.2 | 20.20.20.20 | 2000 | 80 | 3001 | 3001 | - | 1 | - | - | - | - | |
| 421-8 | abc | 3.4 | | | | | | | | | | | | | | |
| 421-9 | abc | 3.6 | 0.2 | 20.20.20.20 | 192.168.10.2 | 80 | 2000 | 12000 | 12000 | - | 1 | - | - | - | - | |
| 421-10 | abc | 4.9 | | 20.20.20.20 | 192.168.10.2 | 80 | 2000 | 12000 | 3001 | - | 1 | 1 | - | - | - | |
| 421-11 | abc | 5.4 | 0.5 | 20.20.20.20 | 192.168.10.2 | 80 | 2000 | 31000 | 3001 | - | 1 | - | - | - | - | |
| 421-12 | abc | 7.6 | | 20.20.20.20 | 192.168.10.2 | 80 | 2000 | 82000 | 3001 | - | 1 | - | - | - | - | |
| 421-13 | abc | 7.7 | 0.1 | 20.20.20.20 | 192.168.10.2 | 80 | 2000 | 83000 | 31000 | - | 1 | 1 | - | - | HTTP/1.0 200 OK | |
| 421-14 | def | 8 | | 192.168.10.4 | 20.20.20.20 | 8000 | 21 | 120000 | | 1 | - | - | - | - | - | - |
| 421-15 | def | 8.5 | 0.5 | 20.20.20.20 | 192.168.10.4 | 21 | 8000 | 3000 | 20001 | 1 | 1 | - | - | - | - | - |
| 421-16 | def | 8.6 | | 192.168.10.4 | 20.20.20.20 | 8000 | 21 | 120001 | 3001 | - | 1 | - | - | - | - | - |

FIG.7

| IP ADDRESS IN POOL ADDRESS BLOCK | USAGE FLAG | OPERATIVE CLIENT IP ADDRESS |
|---|---|---|
| 10.10.20.0 | 1 | - |
| 10.10.20.1 | 1 | - |
| 10.10.20.2 | 1 | 192.168.10.2 |
| 10.10.20.3 | 0 | - |
| ... | ... | ... |

| ADDRESS BLOCK | NETMASK LENGTH | DESTINATION IP ADDRESS | RELAY L3 APPARATUS |
|---|---|---|---|
| 192.168.10.0 | 27 | 20.20.20.20 | L3#A01, L3#A03, L3#A05, L3#A07 |
| 192.168.10.0 | 27 | 20.20.20.21 | L3#A01, L3#A03, L3#A05, L3#A07 |
| ... | ... | ... | ... |
| 10.10.10.0 | 27 | 30.30.30.30 | L3#B01, L3#B03, L3#B05, L3#B06, L3#B08 |
| 10.10.20.0 | 24 | 30.30.30.31 | L3#B01, L3#B03, L3#B05, L3#B07 |

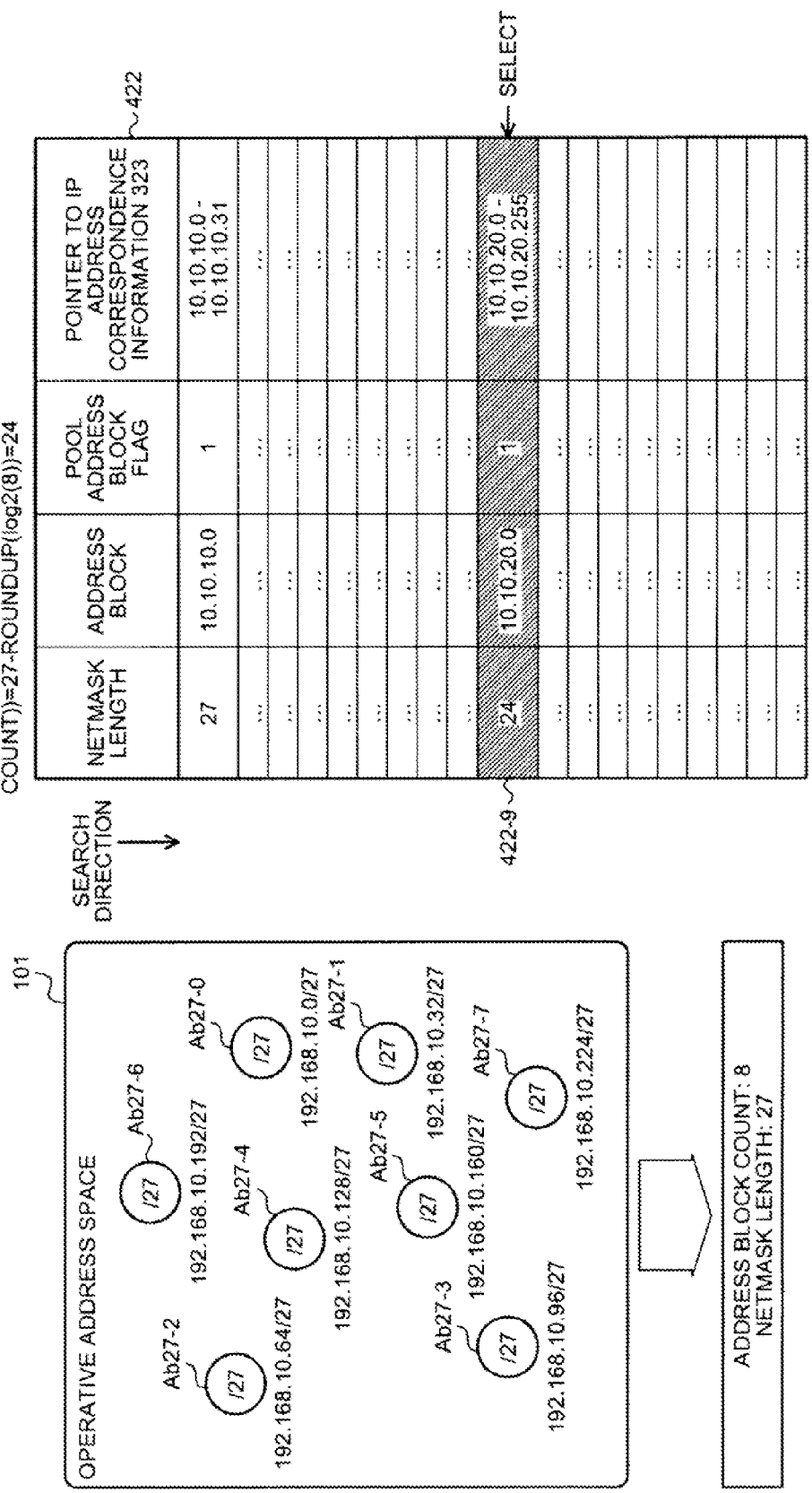

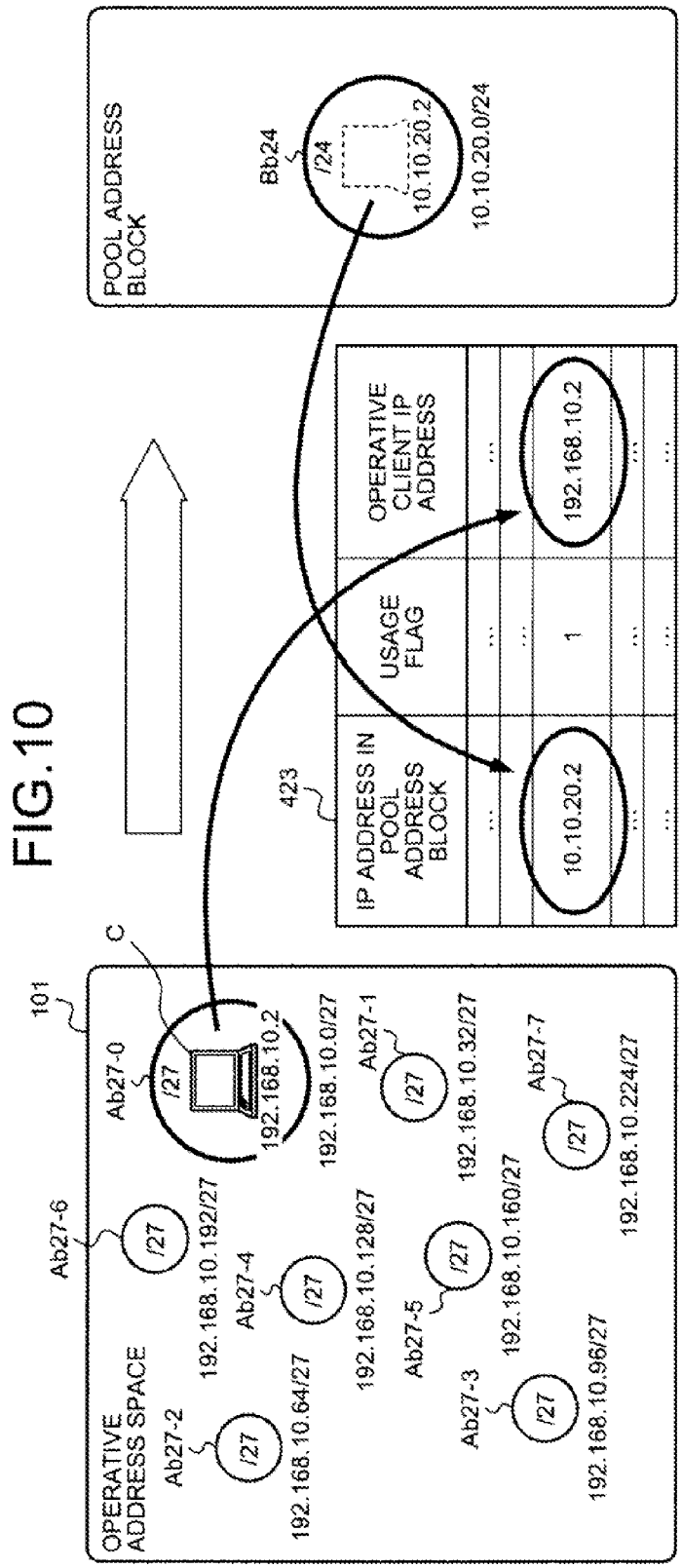

FIG.11

| SESSION ID | TIME INFORMATION | | IP HEADER INFORMATION | | TCP HEADER INFORMATION | | | | | | | | | APPLICATION HEADER INFORMATION | PAYLOAD |
|---|---|---|---|---|---|---|---|---|---|---|---|---|---|---|---|
| | PERIOD | RTT | TRANSMISSION SOURCE IP | DESTINATION IP | TRANSMISSION SOURCE PORT | DESTINATION PORT | SEQUENCE NUMBER | CONFIRMATION RESPONSE NUMBER | SYN | ACK | PSH | FIN | RST | HTTP | |
| 1101-1 abc | 2.5 | 0.2 | 192.168.10.2 | 20.20.20.20 | 2000 | 80 | 10001 | 5001 | | 1 | 1 | - | - | HTTP/1.0 200 OK | |
| 1101-2 abc | 2.5 | 0.2 | 20.20.20.20 | 192.168.10.2 | 80 | 2000 | 5001 | 14001 | | 1 | 1 | - | - | GET | |
| 1101-3 abc | 2.5 | 0.2 | 192.168.10.2 | 20.20.20.20 | 2000 | 80 | 14001 | 7001 | | 1 | 1 | - | - | POST | |
| 1101-4 abc | 2.5 | 0.2 | 20.20.20.20 | 192.168.10.2 | 80 | 2000 | 7001 | 14001 | | 1 | 1 | - | - | HTTP/1.0 200 OK | |

+6000
SESSION ID CONVERSION
IP ADDRESS CONVERSION

| SESSION ID | TIME INFORMATION | | IP HEADER INFORMATION | | TCP HEADER INFORMATION | | | | | | | | | APPLICATION HEADER INFORMATION | PAYLOAD |
|---|---|---|---|---|---|---|---|---|---|---|---|---|---|---|---|
| | PERIOD | RTT | TRANSMISSION SOURCE IP | DESTINATION IP | TRANSMISSION SOURCE PORT | DESTINATION PORT | SEQUENCE NUMBER | CONFIRMATION RESPONSE NUMBER | SYN | ACK | PSH | FIN | RST | HTTP | |
| 1102-1 ijk | 3.8 | 1.4 | 10.10.20.2 | 20.20.20.80 | 9000 | 80 | 10001 | 11001 | | 1 | 1 | - | - | HTTP/1.0 200 OK | |
| 1102-2 ijk | 3.5 | 1.4 | 20.20.20.80 | 10.10.20.2 | 80 | 9000 | 11001 | 14001 | | 1 | - | - | - | GET | |
| 1102-3 ijk | 3.5 | 1.4 | 10.10.20.2 | 20.20.20.80 | 9000 | 80 | 14001 | 13001 | | 1 | 1 | - | - | POST | |
| 1102-4 ijk | 3.8 | 1.4 | 20.20.20.80 | 10.10.20.2 | 80 | 9000 | 13001 | 14001 | | 1 | 1 | - | - | HTTP/1.0 200 OK | |

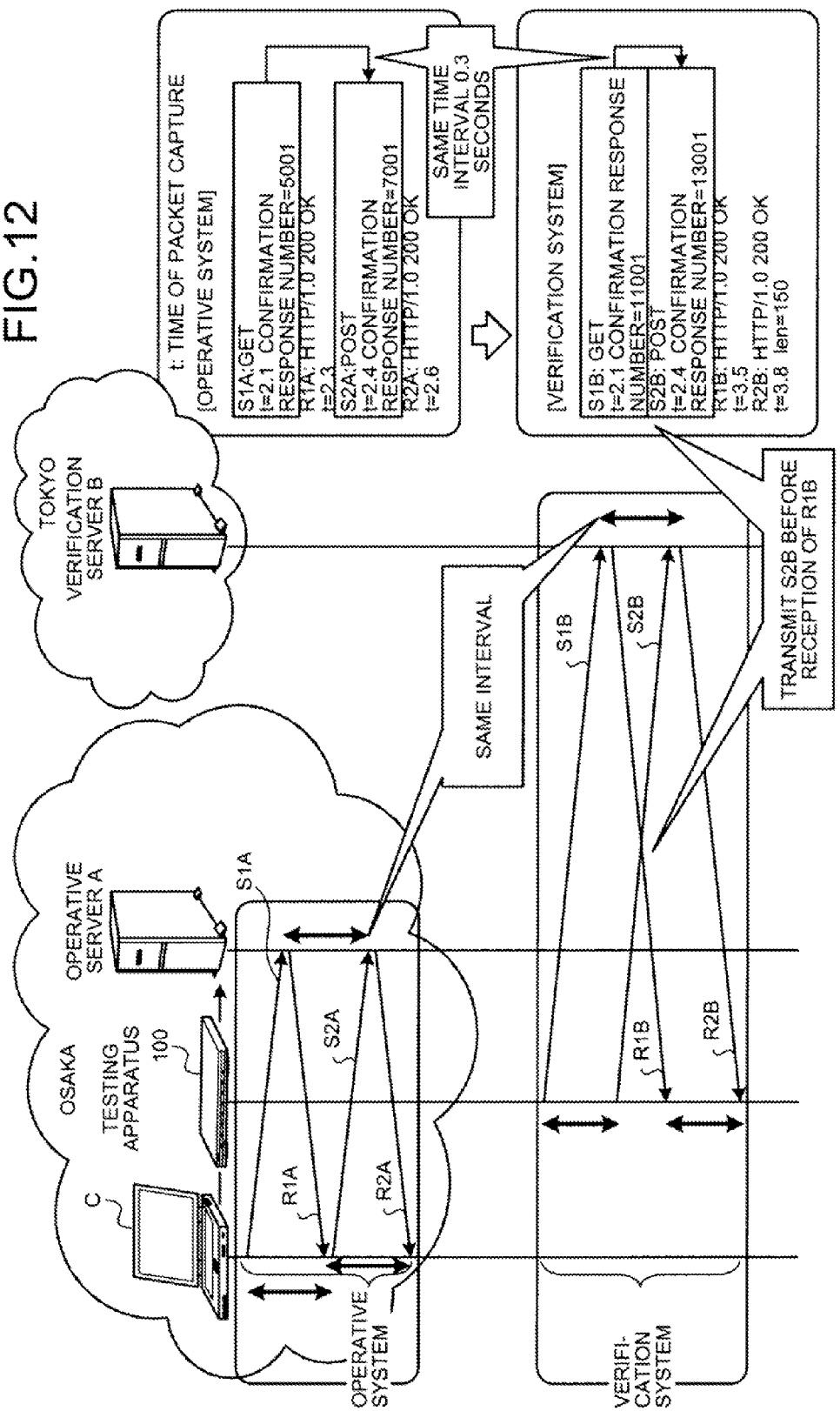

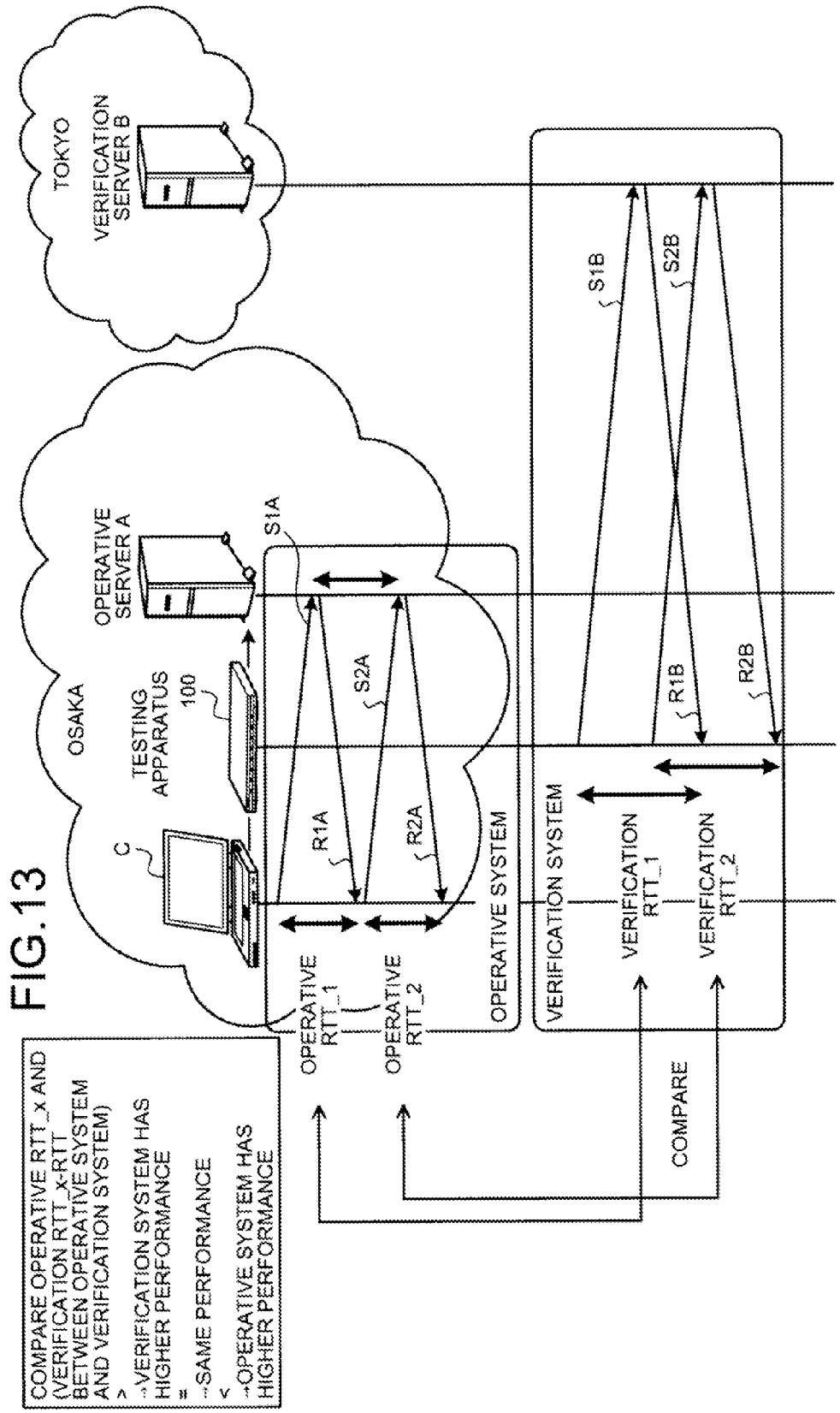

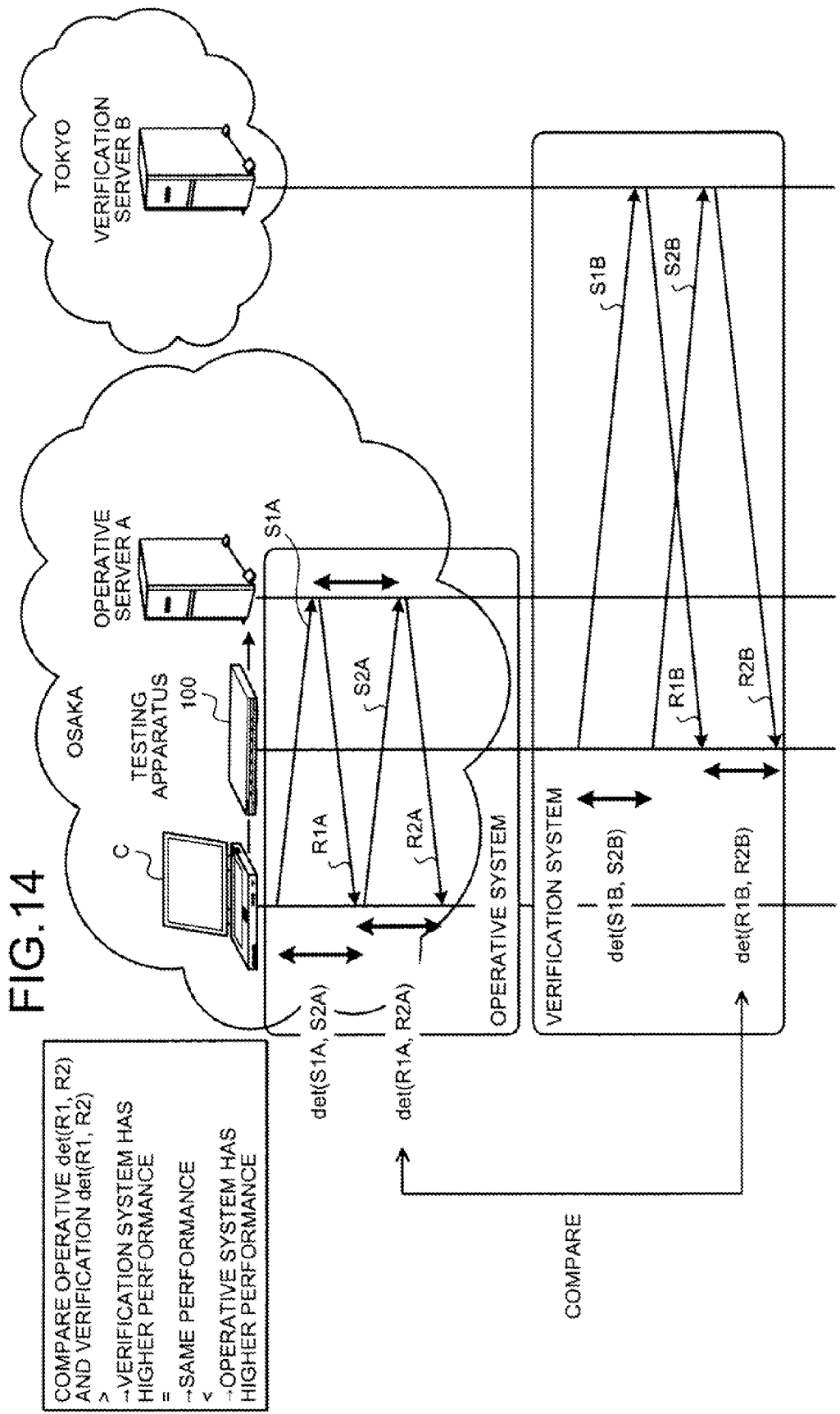

FIG.24

| IP ADDRESS IN POOL ADDRESS BLOCK | USAGE FLAG | OPERATIVE CLIENT IP ADDRESS | |
|---|---|---|---|
| 10.10.20.1 | 1 | 192.168.10.1 | 423-1 |
| ... | ... | ... | IP ADDRESSES IN-USE:18 |
| 10.10.20.18 | 1 | 192.168.10.18 | |
| 10.10.20.19 | 0 | - | |
| ... | ... | - | UNUSED |
| 10.10.20.31 | 0 | - | |
| 10.10.20.32 | 0 | - | |
| 10.10.20.33 | 1 | 192.168.10.33 | |
| ... | ... | ... | IP ADDRESSES IN-USE:20 |
| 10.10.20.52 | 1 | 192.168.10.52 | |
| 10.10.20.53 | 0 | - | |
| ... | ... | - | UNUSED |
| 10.10.20.63 | 0 | - | |
| 10.10.20.64 | 0 | - | |
| 10.10.20.65 | 1 | 192.168.10.65 | |
| ... | ... | ... | |
| 10.10.20.224 | 0 | - | |
| 10.10.20.225 | 1 | 192.168.10.225 | IP ADDRESSES IN-USE:18 |
| ... | ... | ... | |
| 10.10.20.242 | 1 | 192.168.10.242 | |
| 10.10.20.243 | 0 | - | |
| ... | ... | - | UNUSED |
| 10.10.20.254 | 0 | - | |

| IP ADDRESS IN POOL ADDRESS BLOCK | USAGE FLAG | OPERATIVE CLIENT IP ADDRESS | |
|---|---|---|---|
| 10.10.21.1 | 1 | 192.168.10.1 | 423-2 |
| ... | ... | ... | |
| 10.10.21.18 | 1 | 192.168.10.18 | |
| 10.10.21.19 | 1 | 192.168.10.33 | |
| ... | ... | ... | |
| 10.10.21.38 | 1 | 192.168.10.52 | SUCCESSIVE |
| ... | ... | ... | |
| 10.10.21.109 | 1 | 192.168.10.225 | |
| ... | ... | ... | |
| 10.10.21.126 | 1 | 192.168.10.242 | |

FIG.27

| IP ADDRESS IN POOL ADDRESS BLOCK | USAGE FLAG | SESSION COMMENCE- MENT TIME | SESSION COMPLETION TIME | OPERATIVE CLIENT IP ADDRESS |
|---|---|---|---|---|
| 10.10.20.0 | 1 | - | - | |
| 10.10.20.1 | 1 | - | - | |
| 10.10.20.2 | 1 | 0 | 7.7 | 192.168.10.2 |
| 10.10.20.3 | 1 | 8 | 8.6 | 192.168.10.3 |
| ... | ... | ... | ... | |

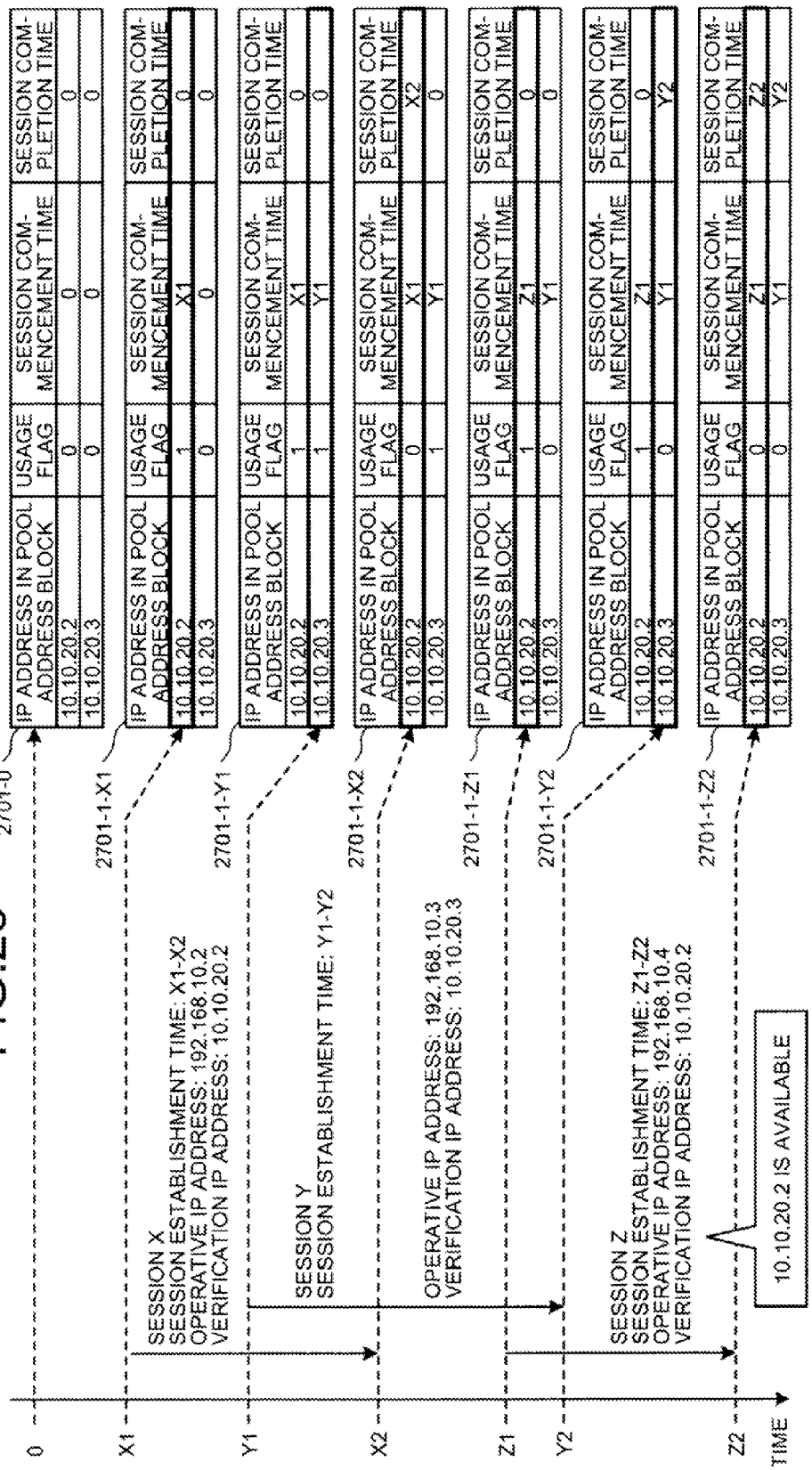

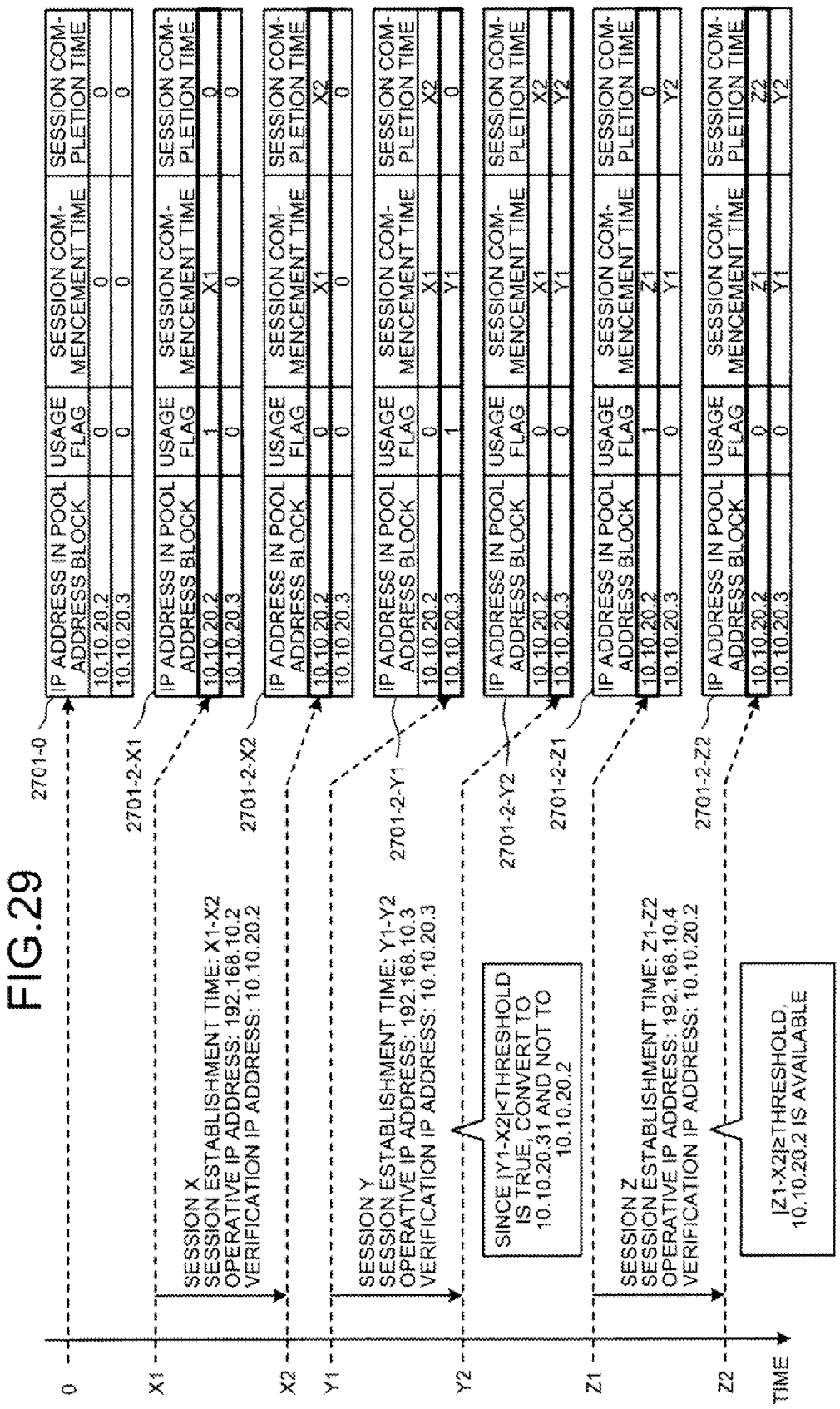

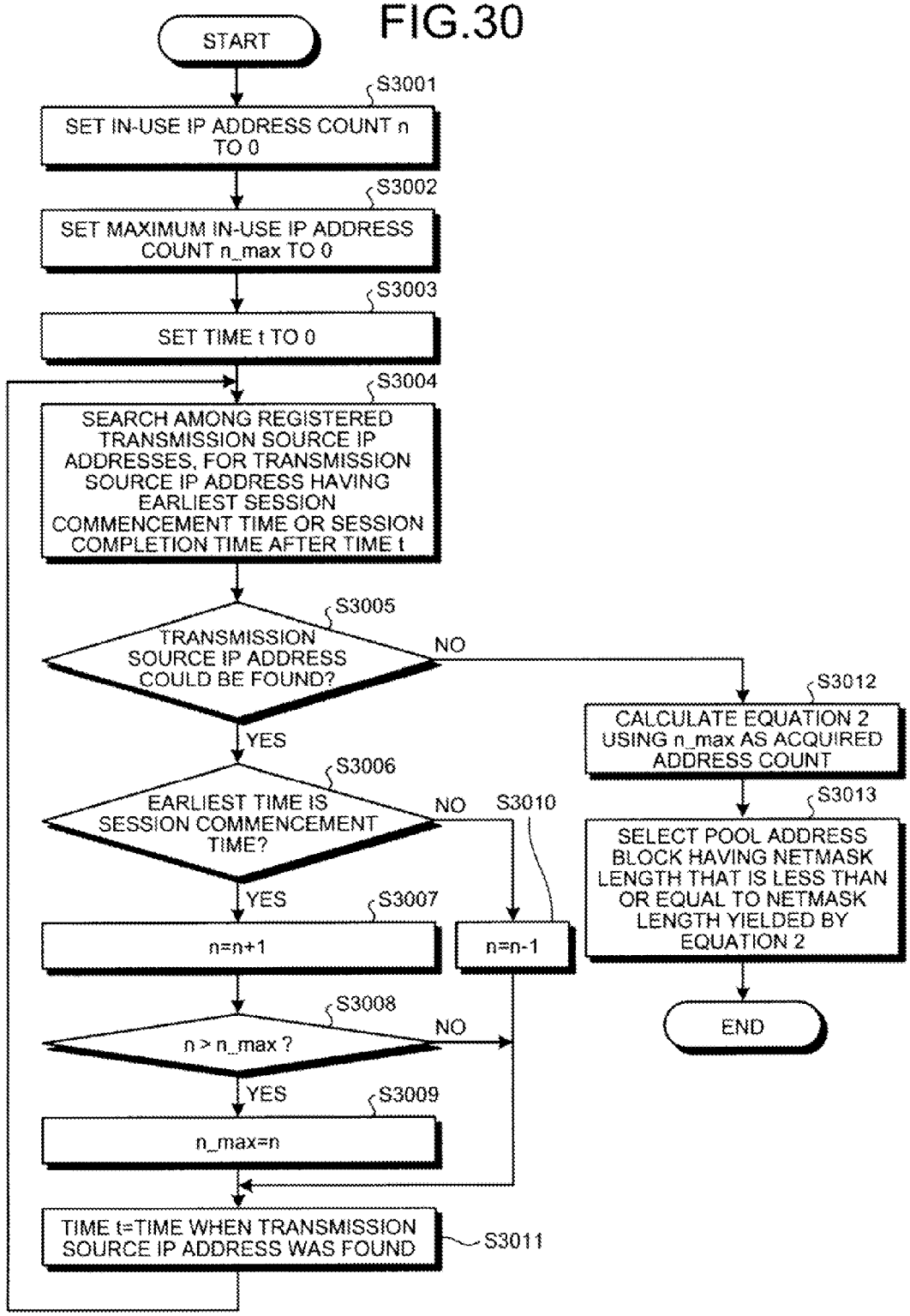

COMPUTER PRODUCT, TESTING APPARATUS, AND TESTING METHOD

This application is based upon and claims the benefit of priority of the prior Japanese Patent Application No. 2011-176348, filed on Aug. 11, 2011, the entire contents of which are incorporated herein by reference.

FIELD

The embodiments discussed herein are related to a computer product, testing apparatus, and testing method for a device.

BACKGROUND

Conventionally, technology that evaluates performance between client servers has been disclosed. For example, when system transition is performed, technology has been demanded that performs pre-verification testing to quickly and accurately verify a verification server. As pre-verification testing technology, communication between operative client servers is reproduced between verification client servers. Therefore, after capturing communication between operative client servers and converting captured data to become communication between verification client servers, a testing apparatus can reproduce communication by transmitting converted packets by the verification system.

Concerning address conversion of captured data, for example, technology has been disclosed that converts the destination address given to an operative server of verification data, into an address of a pseudo apparatus. Further, among technology that converts multiple private networks, technology has been disclosed that uses a table defining mask conversion subjects and the identifiers of the private networks to convert network addresses to the private networks into given netmask values (see, for example, Japanese Laid-Open Patent Publication Nos. H11-220487, 2006-119867, and 2000-253008). Testing apparatus that apply such address technology perform pre-verification testing for each conversion of an operative address into an address in an address block used by the verification system.

Nonetheless, with the conventional technologies above, when the address blocks used by the verification system have a small number of addresses, not all of the operative system addresses may be converted, making the execution of pre-verification testing difficult.

SUMMARY

According to an aspect of an embodiment, a computer-readable medium stores therein a testing program that causes a computer having a storage device storing therein netmask lengths and address block utilization information associated with address blocks, to execute a process. The process includes acquiring first packets transmitted to a first apparatus, where first addresses are regarded as transmission sources; referring to the storage device and acquiring a count of address blocks to which the first addresses belong and an address block netmask length; calculating based on the acquired address block count and the acquired netmask length, the netmask length less a bit count according to the number of the first addresses; referring to the storage device and selecting from among unused address blocks, an address block having a netmask length that is less than or equal to the calculated netmask length; and transmitting to a second apparatus, second packets obtained by setting the transmission sources of the first packets to second addresses in the selected address block.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram depicting an example of a pool address block selection method.

FIG. 3 is a block diagram of a hardware configuration of a computer used in a first embodiment.

FIG. 4 is a block diagram of a functional configuration of the testing apparatus 100.

FIG. 5 is a diagram depicting an example of packet storage information 421.

FIG. 7 is a diagram depicting an example of IP address correspondence information 423.

FIG. 9 is a diagram depicting an example of a pool address block selection method.

FIG. 10 is a diagram depicting an example of an IP address conversion method.

FIG. 11 is a diagram depicting an example of a packet conversion method.

FIG. 12 is a diagram depicting an example of a method of transmitting a converted packet.

FIG. 13 is a diagram depicting an example of a server performance evaluation method.

FIG. 14 is a diagram depicting another example of the server performance evaluation method.

FIG. 24 is a diagram depicting an example of the IP address correspondence information 423 according to the second embodiment.

FIG. 27 is a diagram depicting an example of IP address correspondence information 2701 according to a third embodiment.

FIG. 28 is a diagram depicting an example of address conversion according to temporal changes of the IP address correspondence information 2701 according to the third embodiment.

FIG. 29 is a diagram depicting another example of address conversion according to temporal changes of the IP address correspondence information 2701 according to the third embodiment.

FIG. 30 is a flowchart depicting an example of the address block selection processing according to the third embodiment.

DESCRIPTION OF EMBODIMENTS

Figure 2A:
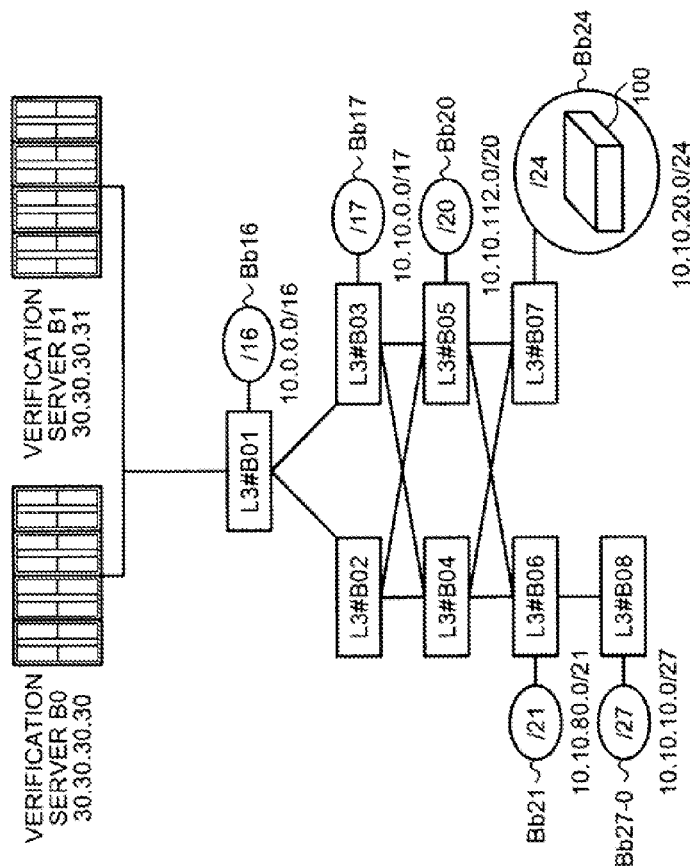
FIG. 2A and FIG. 2B are block diagrams depicting examples of connection of a testing apparatus 100.

Preferred embodiments of the present invention will be explained with reference to the accompanying drawings.

FIG. 1 is a diagram depicting an example of a pool address block selection method. An operative address space 101 is an address space used in communication between operative client servers. A verification address space 102 is an address space used in communication between verification client servers. An address block is group of IP addresses, expressed using network addresses and netmask lengths. For example, address block 192.168.10.0/27 includes the IP address group 192.168.10.0 to 192.168.10.31.

A testing apparatus 100 acquires a group of packets flowing between operative client servers, the number of address blocks to which each packet belongs and the netmask length. In the example depicted in FIG. 1, the following 8 address blocks are assumed to be acquired as address blocks that the packets belong to. The address block acquired first is 192.168.10.0/27 (hereinafter, address block Ab27-0). Further, "A" is used as a symbol related to the operative system and "B" is used as a symbol related to verification system.

The acquired address blocks are 192.168.10.32/27 (hereinafter, address block Ab27-1), 192.168.10.64/27 (hereinafter, address block Ab27-2), 192.168.10.96/27 (hereinafter, address block Ab27-3), 192.168.10.128/27 (hereinafter, address block Ab27-4), 192.168.10.160/27 (hereinafter, address block Ab27-5), 192.168.10.192/27 (hereinafter, address block Ab27-6), and 192.168.10.224/27 (hereinafter, address block Ab27-7). Each of the address blocks has 32 addresses.

The testing apparatus 100, from the number of acquired address blocks (8) and the netmask length (27 bits), calculates a netmask length resulting from subtraction of a bit count according to the address count. Since the address count in an address block increases 2-fold each time the netmask length decreases by 1 bit, to have an 8-fold address count, the netmask length becomes a value that is 3 bits smaller. Therefore, the testing apparatus 100 calculates 24 bits, which results from subtracting 3 bits from the netmask length of 27 bits.

The testing apparatus 100 selects, as a pre-verification test address block, an address block of 24 bits or less from the verification address space 102. The verification address space 102 depicted in FIG. 1 is assumed to have 3 available address blocks, e.g., 10.10.10.0/27 (hereinafter, address block Bb27-0), 10.10.20.0/24 (hereinafter, address block Bb24), and 10.10.80.0/21 (hereinafter, address block Bb21). Further, the testing apparatus 100 uses, as an address block for pre-verification testing, a pool address block storing addresses that are not usually used.

The testing apparatus 100, selects from among the unused address blocks, the address block Bb24, which has a netmask length that is less than or equal to the calculated netmask. The address block Bb24 has 256 addresses and the number of operative-system addresses is 8 (number of acquired address blocks)*32=256 addresses. Therefore, since all of the operative-system addresses can be converted into verification-system addresses, the testing apparatus 100 can execute pre-verification testing. After conversion, the testing apparatus 100 transmits to a verification server B, the packets for which the operative-system addresses have been converted to verification-system addresses.

Figure 2B:
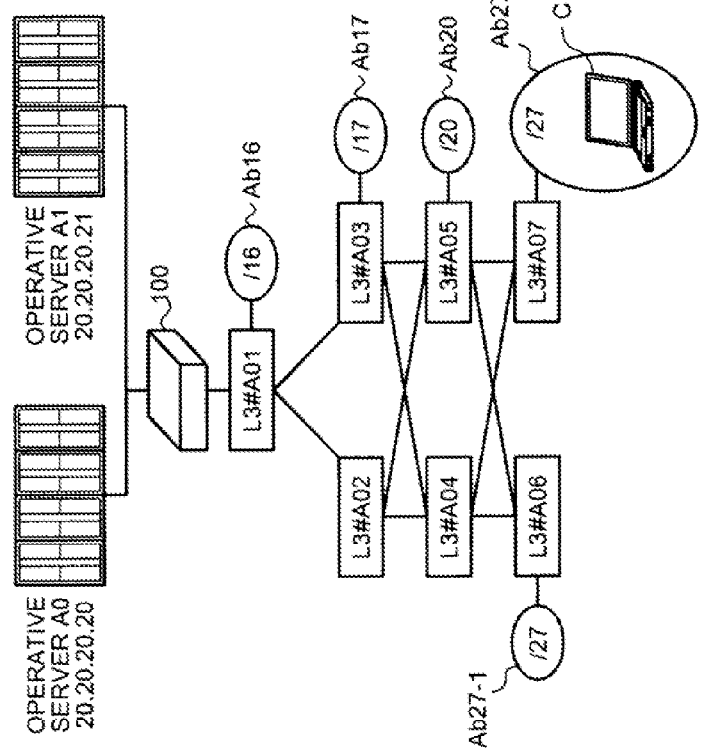

FIG. 2A and FIG. 2B are block diagrams depicting an example of connection of the testing apparatus 100. The testing apparatus 100 has an operative network 201 that is between operative client servers and a verification network 202 that is between verification client servers. Interfaces for both the operative system and the verification system are not necessarily required.

As depicted in FIG. 2A, the operative network 201 includes the testing apparatus 100, the operative server A0, the operative server A1, and L3 switches L3#A01 to L3#A07. The operative server A0 is allocated 20.20.20.20 as an IP address and the operative server A1 is allocated 20.20.20.21 as an IP address. The switches L3#A01 to L3#A07 transfer network layer (layer 3) data in an OSI reference model. The testing apparatus 100 is positioned between the operative server A0, the operative server A1 and the switch L3#A01; and captures packet data between a testing terminal C and the operative server A0 or the operative server A1.

The switch L3#A01 is connected to the operative server A0, the operative server A1, the switches L3#A02 and L3#A03, and the address block Ab16. The switch L3#A02 is connected to the switches L3#A01, L3#A04, and L3#A05. The switch L3#A03 is connected to the switches L3#A01, L3#A04, and L3#A05, and an address block Ab17. Hereinafter, the switches L3#A04 to L3#A07 as well are connected to a switch L3#A0x (x is a natural number), the address block Ab20, the address block Ab27-0, and the address block Ab27-1. In the example depicted in FIG. 2, the testing terminal C is in the address block Ab27-0.

As depicted in FIG. 2B, the verification network 202 includes the testing apparatus 100, a verification server B0, a verification server B1, and L3 switches L3#B01 to L3#B08. The verification server B0 is allocated 30.30.30.30 as an IP address and the verification server B1 is allocated 30.30.30.31 as an IP address. The switches L3#B01 to L3#B08, similar to the switches L3#A01 to L3#A07, transfer network layer data. Further, the testing apparatus 100 is in the selected address block. For example, in FIG. 2, the address block Bb24 is assumed to be selected and therefore, the testing apparatus 100 is in the address block Bb24.

The switch L3#B01 is connected to the verification server B0, the verification server B1, the switch L3#B02, L3#B03, and the address block Bb16. The switch L3#B02 is connected to the switches L3#B01, L3#B04, and L3#B05. The switch L3#B03 is connected to the switches L3#B01, L3#B04, L3#B05, and the address block Bb17. Hereinafter, the switches L3#B04 to L3#B08 as well are connected to a switch L3#B0x (x is a natural number), the address block Bb20, the address block Bb21, the address block Bb24, and the address block Bb27-0.

FIG. 3 is a block diagram of a hardware configuration of a computer used in a first embodiment. Herein, the computer is the testing apparatus 100, an operative server A, the verification server B, and the testing terminal C, which is a client. In FIG. 3, the computer includes a central processing unit (CPU) 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, and a mouse 311, respectively connected by a bus 312.

The CPU 301 governs overall control of the testing apparatus. The ROM 302 stores therein programs such as an operating system (OS) and applications. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The display 308 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device. If the testing apparatus 100 is not assumed to be directly operable by the user, the display 308, the keyboard 310, and the mouse 311 may be omitted.

Functions of the testing apparatus 100 will be described. FIG. 4 is a block diagram of a functional configuration of the testing apparatus 100. The testing apparatus 100 includes an acquiring unit 401, a detecting unit 402, a calculating unit 403, a generating unit 404, a transmitting unit 405, an executing unit 406, and an output unit 407. The testing apparatus 100 further includes a storage device 411, an acquiring unit 412, an acquiring unit 413, a calculating unit 414, and a selecting unit 415.

These functions (the acquiring unit 401 to the output unit 407, the acquiring unit 412 to the selecting unit 415) forming a controller are implemented by executing on the CPU 301, a program stored in a storage device. A storage device is for example, the ROM 302, the RAM 303, the magnetic disk 305, and the optical disk 307 depicted in FIG. 3. The functions may be implemented by program execution on another CPU via the I/F 309.

The testing apparatus 100 has access to packet storage information 421, address block information 422, IP address correspondence information 423, and flow information 424. The packet storage information 421 to the flow information 424 are stored in a storage device such as the RAM 303, the magnetic disk 305, and the optical disk 307.

The packet storage information 421 records captured packets. Details of the packet storage information 421 will be described hereinafter with reference to FIG. 5. The address block information 422 records netmask lengths associated with address blocks and address block utilization information. Details of the address block information 422 will be described hereinafter with reference to FIG. 6. The IP address correspondence information 423 concerns 1 address block of the address block information 422. Details of the IP address correspondence information 423 will be described hereinafter with reference to FIG. 7. The flow information 424 is information indicating which L3 switch is to perform relay when an apparatus set with an IP address in the address block and an operative server or verification server communicate. Details of the flow information 424 will be described hereinafter with reference to FIG. 8.

The acquiring unit 401 has a function of acquiring packets. For example, the acquiring unit 401 captures packets communicated between the testing terminal C and the operative server A, and packets communicated between the verification server B and the testing apparatus 100. Packets acquired by the acquiring unit 401 are subject to header and payload analysis and stored to the packet storage information 421.

The detecting unit 402 has a function of detecting the acquisition period from the beginning of testing of the apparatus to which a packet acquired by the acquiring unit 401 is addressed (destination apparatus under test) until acquisition of the packet, and a function of detecting a response packet that is for the acquired packet and from the apparatus to which the acquired packet was addressed. For example, the detecting unit 402 regards the test start time of the destination apparatus under test as a reference time and detects, as the acquisition period, the time that elapses until the packet is acquired. For example, if the test start time is "12:00:00.0" and the time when a packet that has been transmitted from the testing terminal C is acquired is "12:00:02.1", the detecting unit 402 detects an acquisition period t as 2.1[seconds]. Further, the detecting unit 402 detects a response packet for the packet acquired at "12:00:02.1".

When the acquired packet is a synchronous packet indicating session commencement and the test start time has not been set, the detecting unit 402 sets the acquisition period t of the synchronous packet as t=0, i.e., may detect the acquisition period t as the test start time of the destination apparatus under test. The acquisition time detected by the detecting unit 402 is recorded to the packet storage information 421. The test start time of the destination apparatus under test is preliminarily set to be the same as that at the testing terminal C and the testing apparatus 100. When the test start time arrives, the testing terminal C transmits a packet and the testing apparatus 100 simultaneously starts packet capture, whereby the opportunities for the testing apparatus 100 to capture packets unrelated to the test are reduced, enabling testing to be performed efficiently.

The calculating unit 403 has a function of calculating the time interval from the capture of a given packet until the capture of a packet that is a response to the given packet. For example, the absolute value of the difference of the acquisition period of a given packet and the acquisition period of the response packet for the given packet is calculated as the time interval.

For instance, the calculating unit 403 captures a first packet transmitted from the testing terminal C to a first apparatus under test and a third packet that is transmitted from the first apparatus under test to the testing terminal C and that is a response packet for the first packet. The calculating unit 403 subtracts the acquisition time of the first packet from the acquisition time of the third packet to calculate the first time interval. The calculating unit 403 captures a second packet transmitted from the testing apparatus 100 to a second apparatus under test and a fourth packet that is a response packet and transmitted from the second apparatus under test to the testing terminal C. The calculating unit 403 subtracts the acquisition time of the second packet from the acquisition time of the fourth packet to calculate a second time interval. The time intervals calculated by the calculating unit 403 are recorded to the packet storage information 421 as round trip time (RTT).

When a packet is a first packet transmitted to the first apparatus under test, the generating unit 404 has a function of generating a second packet by re-writing the destination among the information of the first packet to the address of the second apparatus under test.

For example, after X minutes after testing has started, information of packets transmitted during the past X minutes is acquired and the destination IP address, the destination port number, the sequence number, and the confirmation response number are re-written. When a session is established, random numbers are used for the sequence number and the confirmation response number and therefore, session establishment is executed in advance.

The generating unit 404 may generate a second packet group by setting the transmission source of each packet in a first packet group to the addresses in a second address group in the address block selected by the selecting unit 415. The first packet group is acquired by the acquiring unit 412.

For example, the first packet group is assumed to include packet 1 having a transmission source IP of "192.168.10.2" and packet 2 having a transmission source IP of "192.168.10.3", and the selecting unit 415 is assumed to select address block Bb24. In this case, by setting each address in the second address group, the generating unit 404 generates packet 3 by setting "10.10.20.2" as the transmission source of packet 1 and generates packet 4 by setting "10.10.20.3" as the transmission source of packet 2. The second packet group becomes packet 3 and packet 4. The generated second packet group is stored to the RAM 303, the magnetic disk 305, the optical disk 30.

The transmitting unit 405 has a function of transmitting the second packet generated by the generating unit 404 to the second apparatus under test, when the acquisition period (from the start of testing of the second apparatus under test until the acquisition of the first packet) elapses. The transmitting unit 405 further transmits to the second apparatus under test, the second packet group of second packets in which the transmission source of each packet in the first packet group is set as the addresses of the second address group in the address block selected by the selecting unit 415. When the second packet group is generated by the generating unit 404, the transmitting unit 405 may transmit the second packet group to the second apparatus under test.

The executing unit 406 uses a first to a third time interval da to dc to execute comparative performance evaluation processing for the first and the second apparatuses under test as described herein. For example, the executing unit 406 compares the magnitude of the difference of the third time interval dc less the second time interval db and the first time interval da.

If da>dc−db is true, the executing unit 406 evaluates the verification server B (second apparatus under test), to have higher performance than the operative server A (first apparatus under test). If da<dc−db is true, the executing unit 406 evaluates the operative server A (first apparatus under test) to have higher performance than the verification server B (second apparatus under test). If da=dc−db is true, the executing unit 406 evaluates the operative server A (first apparatus under test) and the verification server B (second apparatus under test) to have the same performance.

The executing unit 406 may use a first reception interval det1 that is the reception interval of a packet in the operative system and a second reception interval det2 that is the reception interval of a packet in the verification system to execute the comparative performance evaluation processing for the first and the second apparatuses under test, as described herein.

If det1>det2 is true, the executing unit 406 judges the verification server B (second apparatus under test) to have higher performance than the operative server A (first apparatus under test). If det1<det2 is true, the executing unit 406 judges the operative server A (first apparatus under test) to have higher performance than the verification server B (second apparatus under test). If det1=det2 is true, the executing unit 406 judges the operative server A (first apparatus under test) and the verification server B (second apparatus under test) to have the same performance. Execution results are stored to the RAM 303, the magnetic disk 305, the optical disk 307, etc.

The output unit 407 has a function of outputting execution results obtained by the executing unit 406. For example, the output unit 407 displays on the display 308 and/or prints out the comparative performance evaluation results for the first and the second apparatuses under test, obtained by the executing unit 406.

The storage device 411 stores therein the netmask length and address block utilization information associated with address blocks. Details will be described with the address block information 422.

The acquiring unit 412 has a function of acquiring the first packet group transmitted to the first apparatus under test, where a first address group is regarded as transmission sources. For example, the acquiring unit 412 acquires a first packet group transmitted to the operative server A (first apparatus under test), where addresses in the operative address space 101 (first address group) are regarded as transmission sources. The acquired data is stored to the RAM 303, the magnetic disk 305, the optical disk 307, etc.

The acquiring unit 413 has a function of referring to the storage device 411 and acquiring the number of address blocks to which the first address group belongs and the address block netmask length. For example, the acquiring unit 413 acquires 8 as the address block count and acquires 27 bits as the address block netmask length. The acquired data is stored to the RAM 303, the magnetic disk 305, the optical disk 307, etc.

The calculating unit 414 has a function of calculating based on the address block count and the netmask length acquired by the acquiring unit 413, the netmask length less a bit count according to the number of addresses included in the first address group. For example, assuming that the acquired address block count is 8 and the netmask length is 27 bits, the calculating unit 414 calculates 24 as a value 3 bits smaller than 27 bits.

The calculating unit 414 may calculate the value of the address block netmask length less the binary logarithmic value (rounded up) of the acquired address block count. The calculation will be described hereinafter with reference to FIG. 9. The calculated data is stored to the RAM 303, the magnetic disk 305, the optical disk 307, etc.

The selecting unit 415 refers to the storage device 411 and from an unused address block group, selects an address block having a netmask length that is less than or equal to the calculated netmask length. For example, if a netmask length of 24 bits is calculated by the calculating unit 414, the selecting unit 415 selects an address block having a netmask length of 24 bits or less.

The selecting unit 415 may select from the unused address block group, the address block having the greatest netmask length that is less than or equal to the calculated netmask length. For example, if the unused address block group includes address blocks having netmask lengths of 17, 20, 21, 24 and 25 bits, and the netmask length calculated by the calculating unit 414 is 24, the selecting unit 415 selects the address block Bb24 having a netmask length of 24 bits. Information of the selected address block is stored to the RAM 303, the magnetic disk 305, the optical disk 307, etc.

FIG. 5 is a diagram depicting an example of the packet storage information 421. The packet storage information 421 has a session ID field, a time information field, an Internet Protocol (IP) header information field, a Transmission Control Protocol (TCP) header information field, an application header information field, and a payload field. The packet storage information 421 has values for each field, according to packet. The packet storage information 421 depicted in FIG. 5 is stored as record 421-1 to record 421-16 for the packets. The session ID field indicates the session ID. When sessions are the same, the same session ID is indicated.

The time information field has a period subfield and an RTT subfield. The period subfield indicates the acquisition period from the start of the testing of the destination apparatus under test until packet acquisition. For example, since record 421-1 is for the packet that is captured first, the reference time t=0.0 is stored.

If the captured packet is from the operative server A or the verification server B, the RTT subfield indicates the RTT. The RTT is the time interval from capture of the packet until capture of the response packet therefor. RTT is calculated by the calculating unit 403.

The IP header information field has a transmission source IP field and a destination IP field. The transmission source IP field indicates the transmission source IP address described in the IP header of the captured packet. The destination IP field indicates the destination IP address described in the IP header of the captured packet. In FIG. 5, the IP address of the testing terminal C is 192.168.10.2 and the IP address of the operative server A is 20.20.20.20. Therefore, the first record 421-1 is for a packet from the testing terminal C to the operative server A and the second record 421-2 is for the response packet thereof.

The TCP header information field has a transmission source port field, a destination port field, a sequence number field, a confirmation response number field, and various flags (SYN(synchronous)/ACK(confirmation response)/PSH (push)/FIN(communication end)/RST(reset request)). The transmission source port field indicates the transmission source port number described in the TCP header of the captured packet. The destination port field indicates the destination port number described in the TCP header of the capture packet.

The sequence number field indicates the sequence number described in the TCP header of the captured packet. The initial value of the sequence number is random value given at the testing terminal C·the operative server and the transmission source of the captured packet.

The confirmation response number field indicates the confirmation response number described in the TCP header of the captured packet. The confirmation response number is a value given based on the sequence number of the packet received by the computer on the receiving side. For example, in the case of 3-way handshake, the confirmation response number is the sequence number of the SYN packet received by the server plus 1.

The flags indicate the packet type (SYN/ACK/PSH/FIN/ RST). For example, the packet of record 421-1 is indicated to be a SYN packet.

The application header information field indicates header information related to applications including HyperText Transfer Protocol (HTTP), Post Office Protocol (POP) 3/Internet Message Access Protocol (IMAP). For example, in the case of an HTTP header, cookie information is also included in the application header information field.

The payload field indicates the payload, which is the data body less the header of the captured packet. Communication according to TCP/IP is implemented by executing a series of processes including establishing 3-way handshake, data transfer, and session completion. In the 3-way handshake, the testing terminal C sends a SYN packet (sequence number: the random number on the testing terminal C side, confirmation response number: 0, SYN flag) to the operative server A.

The operative server A that has received the SYN packet sends a SYN/ACK packet (sequence number: the random number on the operative server A server side, confirmation response number: the sequence number of the SYN packet+1, SYN flag, ACK flag) to the testing terminal C. The testing terminal C, upon receiving the SYN/ACK packet, sends an ACK packet (sequence number: the confirmation response number on the operative server A side, confirmation response number: the sequence number of the SYN/ACK packet+1, ACK flag) to the operative server A. In the example depicted in FIG. 5, the packet group from record 421-1 to record 421-3 and the packet group from record 421-14 to record 421-16 are packet groups executing 3-way handshake.

Figure 6:
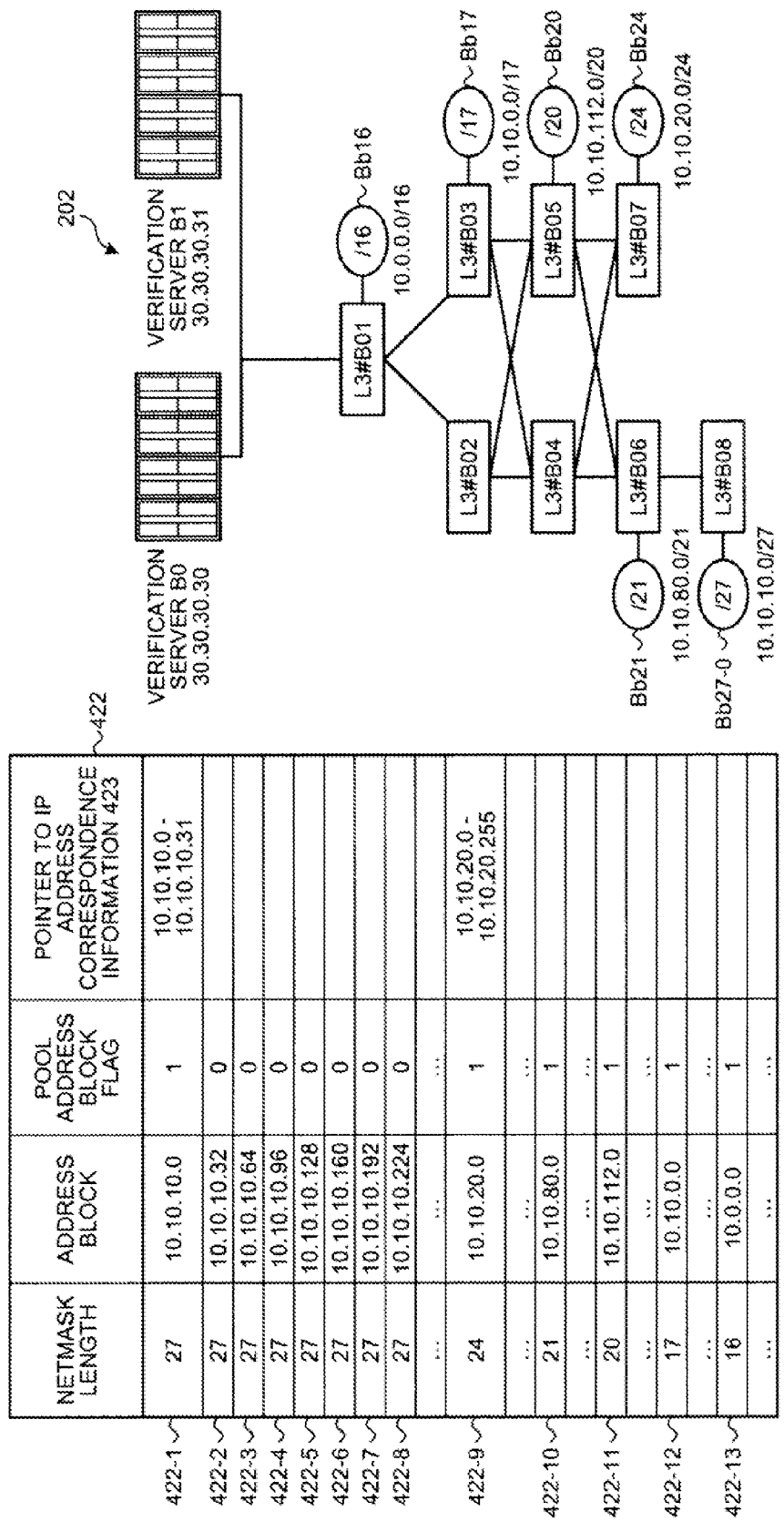
FIG. 6 is a diagram depicting an example of address block information 422.

FIG. 6 is a diagram depicting an example of the address block information 422. The address block information 422 has 4 fields including a netmask length field, an address block field, a pool address block flag, and a pointer to the IP address correspondence information 423. The address block information 422 indicates values for each of the fields, according to address block. The address block information 422 depicted in FIG. 6 is stored as record 422-1 to record 422-13 for the address blocks. The address block information 422 is registered in descending order of netmask length. The larger the netmask length is, the fewer the included addresses are.

The netmask length field indicates the address block network length. The address block field indicates the registered address-block network address. The pool address block flag indicates whether the address block is a pool address block. The pool address block flag depicted in FIG. 6 indicates a pool address block by a value of 1.

The pointer to IP address correspondence information 423 is a pointer to the address group that the address block has. For example, the pointer to the IP address correspondence information 423 indicates a list of addresses that the address block has.

For instance, record 422-1 has fields concerning the address block Bb27-0. Record 422-1 indicates that the address of the address block Bb27-0 is 10.10.10.0/27 and that the address block is a pool address block. Record 422-1 further indicates that the address block Bb27-0 has addresses including 10.10.10.0 to 10.10.10.31.

Similarly, although not depicted in FIG. 6, record 422-2 to record 422-8 indicate fields for the address block Bb27-1 to the address block Bb27-7. Record 422-9 indicates fields for the address block Bb24; record 422-10 indicates fields for the address block Bb21; and record 422-11 indicates information for the address block Bb20. Record 422-12 indicates fields for the address block Bb17 and record 422-13 indicates information for the address block Bb16.

FIG. 7 is a diagram depicting an example of the IP address correspondence information 423. The IP address correspondence information 423 has 3 fields including an IP address in the pool address block field, a usage flag, and an operative client IP address field. The IP address in the pool address block field indicates an address included in the selected pool address block. The usage flag indicates whether the address of the pool address block is being used. The operative client IP address field indicates the IP address of the operative client corresponding to the address of the pool address block.

For example, in the IP address correspondence information 423 depicted in FIG. 7, the address of the address block Bb24 is registered. Record 423-1 to record 423-3 indicate that 10.10.20.0 to 10.10.20.2 are being used and record 423-4 indicates that 10.10.20.3 is not being used. Record 423-3 indicates that the IP address of the testing terminal C, which is the operative client corresponding to 10.10.20.2, is 192.168.10.2.

Figures 8A, 8B:
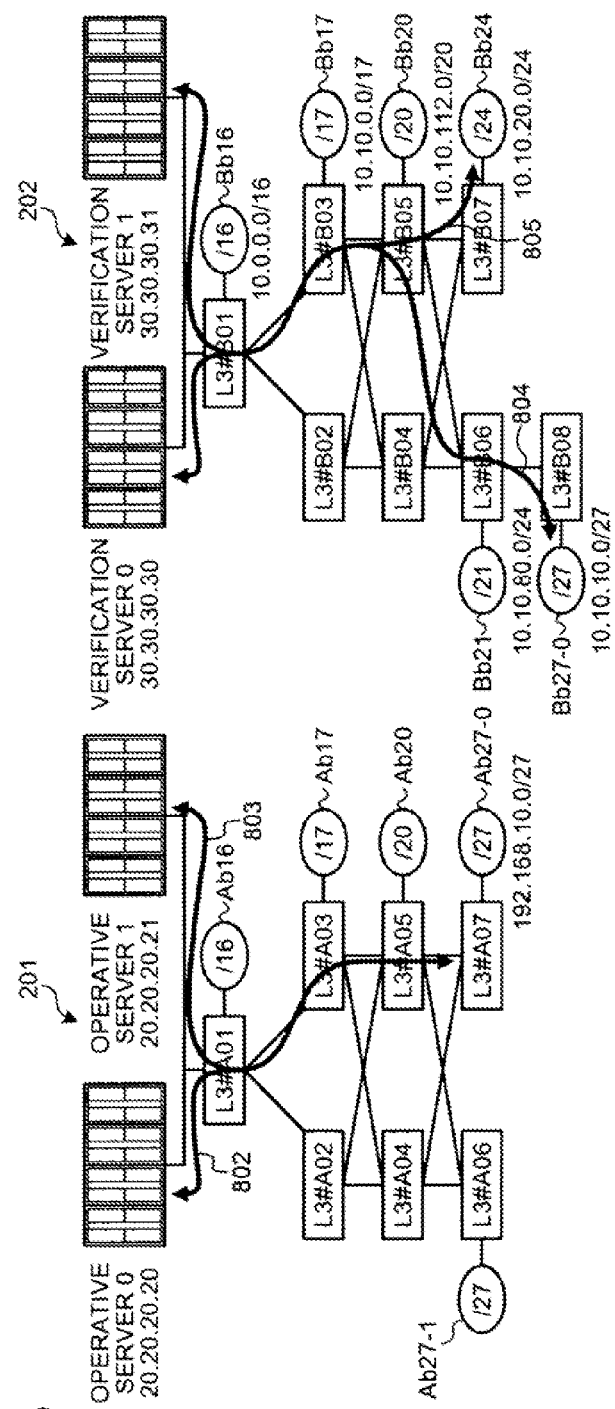
FIG. 8A is a diagram depicting an example of flow information 424.
FIG. 8B is a diagram of an example of application of flow information 424.

FIG. 8A is a diagram depicting an example of the flow information 424. FIG. 8B is a diagram of an example of application of the flow information 424.

As depicted in FIG. 8A, the flow information 424 has 4 fields including an address block field, a netmask length field, a destination IP address field, and a relay L3 apparatus field. The address block field indicates the network address of the target address block. The netmask length field indicates the netmask length of the target address block. The destination IP address field indicates the IP address of the communication counterpart server. The relay L3 apparatus field indicates identifier information of the L3 apparatus performing relay when the apparatus set with the IP address in the target address block and the server set with the destination IP address communicate.

FIG. 8B depicts in the operative network, the operative network 201 and the verification network 202 depicted in FIG. 2. Record 424-1 (see FIG. 8A) indicates that when the apparatus allocated an IP address in the address block Ab27-0 communicates with 20.20.20.20, the switches L3#A01, L3#A03, L3#A05, L3#A07 perform relay. The information indicated by record 424-1 forms a path 802 (see FIG. 8B). Similarly, the information indicated by record 424-2 represents a path 803; the information indicated by record 424-3 represents a path 804; and the information indicated by record 424-4 represents a path 805 (see FIG. 8B).

FIG. 9 is a diagram depicting an example of the pool address block selection method. With reference to FIG. 9, the pool address block selection method that refers to the operative address space 101 and the address block information 422, and is used in pre-verification testing will be described.

From the operative address space 101, the testing apparatus 100 detects that 8 address blocks are present. For example, in the operative address space 101, 8 address blocks (address block Ab27-0 to address block Ab27-7) are present.

The testing apparatus 100 calculates a consolidated netmask length of the detected address block Ab27-0 to address block Ab27-7. For example, according equation 1 below, the testing apparatus 100 calculates the netmask length of the address block that can be implemented by pre-verification testing.

$$=\text{netmask length} - \text{ROUNDUP}(\log 2(\text{address block count})) \quad (1)$$

Where, the ROUNDUP function is a rounding up function and the log 2 function is a function that obtains a binary logarithmic function. In equation 1, after the result of the log 2 function is rounded up, the resulting value is subtracted from the netmask length. However, after the result of the log 2 function is subtracted from the netmask length, the resulting value may be rounded down. This calculation method is also valid for equation 2 described hereinafter. In the example depicted in FIG. 9, since the address block count is 8 and the netmask length is 27, the testing apparatus 100 calculates the netmask length for the pre-verification test, by equation 1 as follows.

$$=27 - \text{ROUNDUP}(\log 2(8)) = 24$$

After calculation, the testing apparatus 100 (from the head of the address block information 422) sequentially searches among records having a pool address block flag of 1, for a record having an address block count that is less than or equal to the calculated address block count. The address block information 422 is registered in descending order of netmask length and therefore, the first record to meet the condition is closest to the optimal netmask length and is an address block that can be implemented by the pre-verification test. In the example depicted in FIG. 9, the testing apparatus 100 selects record 422-9.

Further in the example depicted in FIG. 9, although an address block of the same netmask length is retrieved, an address block of a different netmask length may be retrieved and there may be cases when the netmask length cannot be calculated by equation 1, such as when the testing apparatus 100 detects 8 address blocks having a netmask length of 27 and 8 address block having a netmask length of 24.

In this case, the testing apparatus 100 consolidates from the block size having a large netmask length. First, the testing apparatus 100 calculates equation 1 for the netmask length of 27.

$$=27 - \text{ROUNDUP}(\log 2(8)) = 24$$

In this manner, by calculating the netmask length by equation 1, the testing apparatus 100 obtains a result where the 8 address blocks having a netmask length of 27 can be consolidated to 1 address block of a netmask length of 24. Thus, the number of address blocks having a netmask length of 24 increases by 1, from 8 to 9. The testing apparatus 100 calculates equation 1 for the netmask length of 24 as follows.

$$=24 - \text{ROUNDUP}(\log 2(9)) = 20$$

In this manner, the testing apparatus 100 calculates 20 as the optimal netmask length for pre-verification testing. For example, the testing apparatus 100 selects address block Bb20 as the address block for pre-verification testing.

FIG. 10 is a diagram depicting an example of an IP address conversion method. With reference to FIG. 10, methods for converting an IP address in the operative address space 101 and an IP address in the pool address block will be described. As an example, in FIG. 10, the IP addresses in address block Ab27-0 to address block Ab27-7 are converted to IP addresses in address block Bb24. In this case, the testing apparatus 100 re-writes an IP address 192.168.10.X in the operative system to an IP address 10.10.20.X in the block Bb24. For example, the testing apparatus 100 converts 192.168.10.2 in the address block Ab27-0 to the IP address 10.10.20.2 in the address block Bb24.

In the case of such conversion, the testing apparatus 100 sets the IP address field for the pool address block in the IP address correspondence information 423 as 10.10.20.2, which is the IP address to which conversion is to be made. The testing apparatus 100 sets the operative client IP address field as 192.168.10.2 and sets the usage flag to 1.

FIG. 11 is a diagram depicting an example of a packet conversion method. In the example depicted in FIG. 11, the testing apparatus 100 converts packet data 1101, which is a communication result of the testing terminal C (operative client), packet data 1102 at a verification client.

In FIG. 11, among the packet data 1101-1 to the packet data 1101-4, the packet data 1101-1 and the packet data 1101-3 (respectively uplink packets) are converted and the packet data 1102-1 and the packet data 1102-3 are obtained. The packet data 1101-2 and the packet data 1101-4 are packet data from an operative server; and the packet data 1102-2 and the packet data 1102-4 are packet data from a verification server.

For example, the testing apparatus 100 converts the session ID, the transmission source IP address, and the confirmation response number. Although not depicted in FIG. 11, the testing apparatus 100 suitably converts the transmission source MAC address, the destination MAC address, the destination IP address, the checksum of the IP header, the checkthumb of the TCP header, etc.

Concerning the IP address conversion method, the testing apparatus 100, for a transmission source IP, performs conversion from the IP address of the operative client to an IP address in the pool address block. The testing apparatus 100, for a destination IP address, performs conversion from the IP address of the operative server to the IP address of the verification server.

Concerning a method of confirmation response number conversion, when the testing apparatus 100 performs 3-way handshake with the verification server, the verification server acquires the initial value of the sequence number provided to the testing apparatus 100 and the testing apparatus 100 performs conversion based on the received initial value. The initial value acquired by the verification server is a random number and therefore, the testing apparatus 100 cannot estimate the value of the random number. However, the rate by which the sequence number increases consequent to communication after the 3-way handshake is estimated to be the same for the operative system and the verification system and therefore, the testing apparatus 100 converts the confirmation response number, based on the operative packet data. Concerning cookie information of the HTTP header, etc., information that is to be converted and information that need not be converted is preliminarily stored as information and the testing apparatus 100 converts the information that is to be converted.

Concerning a method of session ID conversion, since different values are generated each time a normal server performs communication, the testing apparatus 100 processes the values as information unique to the server. For example, the verification server transmits a generated session ID to the testing apparatus 100 corresponding to the client indicated in a cookie. The testing apparatus 100, having received the session ID, uses the received session ID when performing communication.

FIG. 12 is a diagram depicting an example of a method of transmitting a converted packet. The packet data 1101-1 depicted in FIG. 11 represents a packet S1A (a first packet) and the packet data 1101-2 represents a packet R1A (a third packet). Further, the packet data 1101-3 represents a packet S2A (a first packet) and the packet data 1101-4 represents a packet R2A (a third packet).

The packet data 1102-1 represents a packet S1B (a second packet) and the packet data 1102-2 represents a packet R1B (a fourth packet). Further, the packet data 1102-3 represents a packet S2B (a second packet) and the packet data 1102-4 represents a packet R2B (a fourth packet).

As depicted in FIG. 12, the transmission of the packet S2B to the verification server B is executed before the reception of the packet R1B from the verification server B. Therefore, the time intervals of the packets S1A, S2A transmitted to the operative server A and the time intervals of the packets S1B, S2B transmitted to the verification server B are identical.

Thus, in communication based on TCP/IP, header information is suitably converted, whereby without waiting for a response from the remote verification server B, packets can be successively sent from the operative server A. Consequently, the verification server B can execute the same processing as the operative server A, at the same timing and with respect to the verification server B, can reproduce a load test equivalent to the load of the operative server A. Communication according to the embodiments may be UDP/IP based communication.

FIG. 13 and FIG. 14 depict an example of a server performance evaluation method. If RTT between the operative system and the verification system is to be measured, the testing apparatus 100 can adopt the server performance evaluation method depicted in FIG. 13. If the RTT between the operative system and the verification system is not to be measured or cannot be measured, the testing apparatus 100 can evaluate server performance by adopting the server performance evaluation method depicted in FIG. 14.

FIG. 13 is a diagram depicting an example of a server performance evaluation method. The testing apparatus 100 calculates from the packet data 1101 and the packet data 1102, an operative RTT_x (first time interval da) and a verification RTT_x (second time interval db). The RTT between the operative system and the verification system (third time interval dc) is assumed to be 1.2[seconds]. Here, x is a natural number. For example, in the operative system, from the time information of the packet data 1101-1 and the packet data 1101-2, the testing apparatus 100 calculates the operative RTT_1=2.3−2.1=0.2[seconds]. From the time information of the packet data 1101-3 and the packet data 1101-4, the testing apparatus 100 calculates the operative RTT_2=2.6−2.4=0.2 [seconds].

Similarly, in the verification system, from the time information of the packet data 1102-1 and the packet data 1102-2, the testing apparatus 100 calculates the verification RTT_1=3.5−2.1=1.4[seconds]. From the time information of the packet data 1102-3 and the packet data 1102-4, the testing apparatus 100 calculates the verification RTT_2=3.8−2.4=1.4[seconds].

After calculation of the operative RTT_x and the verification RTT_x, the testing apparatus 100 compares the operative RTT_x and (the verification RTT_x-the RTT between the operative system and the verification system) to evaluate server performance.

The testing apparatus 100 determines the verification system to have higher performance, if the left term is greater; determines the verification system and the operative system to have the same performance, if the left and the right terms are equivalent; and determines the operative system to have higher performance if the right term is greater.

For example, the testing apparatus 100 evaluates server performance assuming that the operative RTT_1=0.2, the verification RTT_x=1.4, and the RTT between the operative system and the verification system=1.2.

$$0.2=(1.4-1.2)$$

Thus, since the left and the right terms are equivalent, the testing apparatus 100 evaluates the operative system and the verification system to have the same performance.

FIG. 14 is a diagram depicting another example of the server performance evaluation method. The server performance evaluation method described with reference to FIG. 14 assumes that the transmission interval of uplink packets is the same for the operative system and the verification system. When the transmission intervals of uplink packets are equivalent, the time intervals of downlink packets can be expected to be the same, without being affected by RTT and therefore, the testing apparatus 100 calculates the arrival interval of downlink packets and evaluates server performance from the extension. The testing apparatus 100 calculates from the packet data 1101 and the packet data 1102 and for the operative system and the verification system, det(RxA, RyA) which is the first reception interval det1 and det(RxB, RyB) which is the second reception interval det2. Here, x and y are natural numbers. The det function is a function yielding the difference of 2 arguments.

The testing apparatus 100 calculates from the packet data 1101, det(R1A, R2A)=2.6-2.3=0.3. The testing apparatus 100 calculates from the packet data 1101, det(R1B, R2B)= 3.8-3.5=0.3. After calculating det(RxA, RyA) and det(RxB, RyB), the testing apparatus 100 compares the operative det (R1, R2) and the verification det(R1, R2).

The testing apparatus 100 evaluates the verification system to have higher performance, if the left term is greater; evaluates the verification system and the operative system to have the same performance, if the left and the right terms are equivalent; and evaluates the operative system to have higher performance, of the right term is greater.

In the example above, the testing apparatus 100 substitutes the operative det(R1, R2)=0.3 and the verification det(R1, R2)=0.3 and evaluates server performance.

$$0.3=0.3$$

Thus, since the left and the right terms are equivalent, the testing apparatus 100 evaluates the operative system and the verification system to have the same performance.

Figure 15:
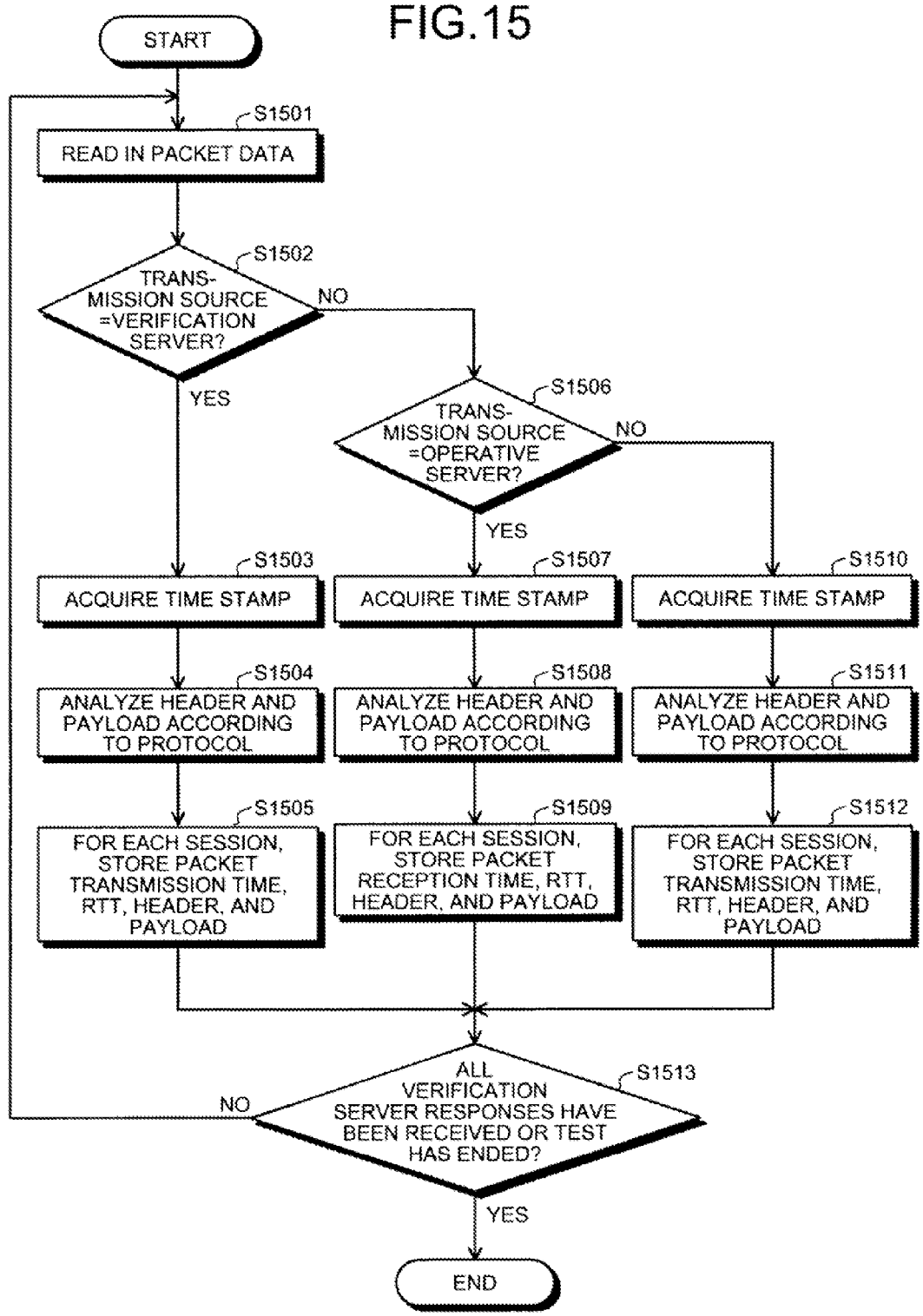
FIG. 15 is a flowchart depicting an example of packet reading processing.

FIG. 15 is a flowchart depicting an example of packet reading processing. The testing apparatus 100 reads in packet data (step S1501). In the processing hereinafter, the testing apparatus 100 performs processing with respect to the read packet data. The testing apparatus 100 judges whether the transmission source is the verification server (step S1502). If the transmission source is the verification server (step S1502: YES), the testing apparatus 100 acquires a time stamp (step S1503), and analyzes the header and the payload according to the protocol format (step S1504).

After analysis, the testing apparatus 100 stores the packet transmission time, the RTT, the header, and the payload for each session (step S1505). As an example of the header and the payload, the testing apparatus 100 stores the transmission source IP address and the destination IP address included in the IP header information. The testing apparatus 100 stores the transmission source port number, the destination port number, the sequence number, the confirmation response number, and the SYN/ACK/PSH/FIN/RST flags included in the TCP header information. The testing apparatus 100 stores application header information related to each HTTP and POP3/IMAP application, and payloads that include information other than that of the header.

If the transmission source is not the verification server (step S1502: NO), the testing apparatus 100 judges whether the transmission source is the operative server (step S1506). If the transmission source is the operative server (step S1506: YES), the testing apparatus 100 acquires a time stamp (step S1507), and analyzes the header and the payload according to the protocol format (step S1508). After analysis, the testing apparatus 100 stores the packet reception time, the RTT, the header, and the payload for each session (step S1509).

If transmission source is not the operative server (step S1506: NO), the testing apparatus 100 acquires a time stamp (step S1510), and analyzes the header and the payload according to the protocol format (step S1511). Packet data at step S1506: NO is, for example, packet data for which the transmission source is the testing terminal C. After analysis, the testing apparatus 100 stores the packet transmission time, the RTT, the header, and the payload for each session (step S1512).

After completing the processes at step S1505, step S1509, and step S1512, the testing apparatus 100 judges if all of the verification server responses have been received or if the test has ended (step S1513). If not all of the verification server responses have been received and the test has not ended (step S1513: NO), the testing apparatus 100 transitions to step S1501. If all of the verification server responses have been received, or if the test has ended (step S1513: YES), the testing apparatus 100 ends the packet reading processing.

Figure 16:
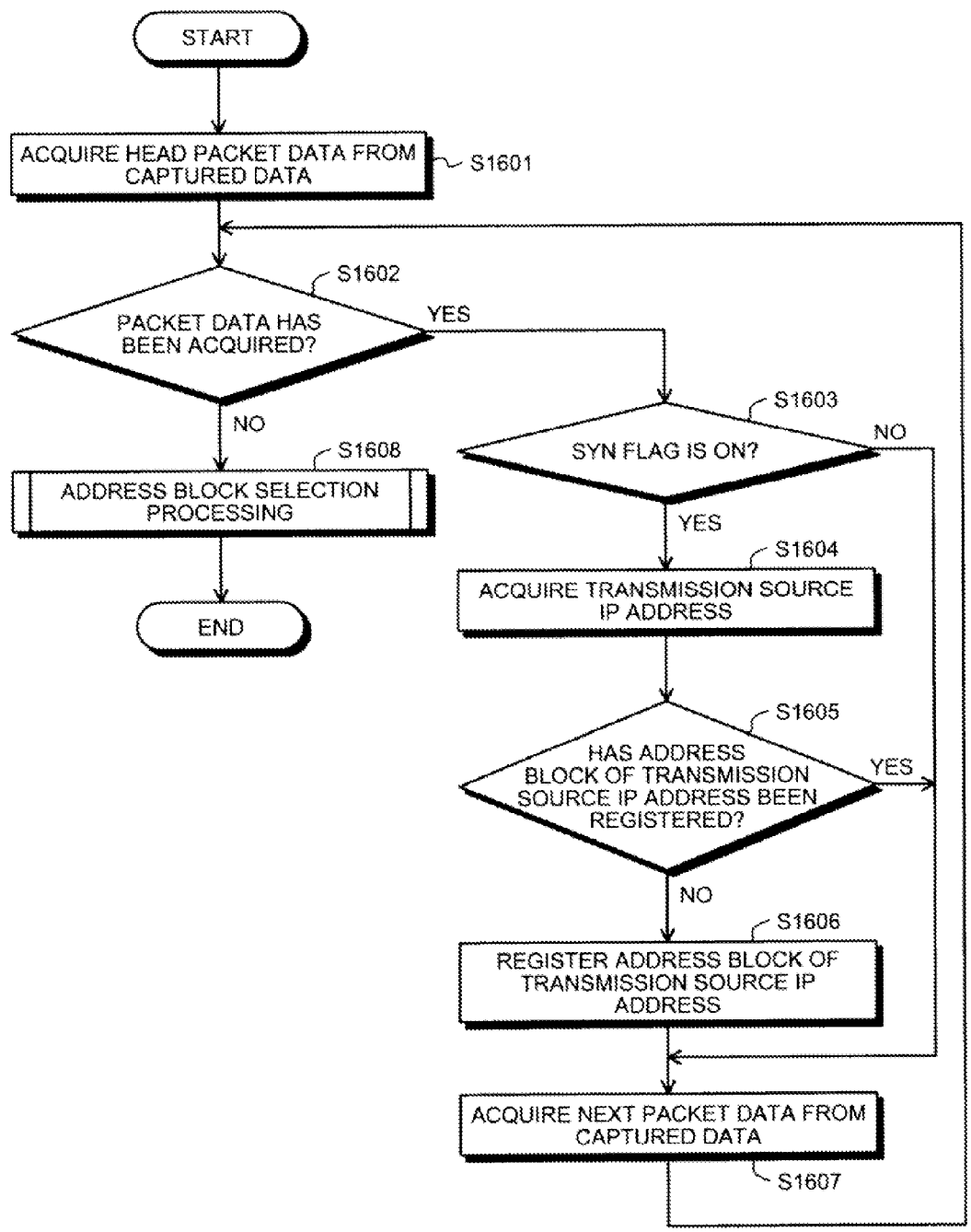
FIG. 16 is a flowchart depicting an example of address block registration processing.

FIG. 16 is a flowchart depicting an example of address block registration processing. The testing apparatus 100 acquires the head packet data from captured data (step S1601). The testing apparatus 100 judges whether the packet data has been read in (step S1602). If the packet data has been acquired (step S1602: YES), the testing apparatus 100 judges whether the SYN flag of the read packet data is ON (step S1603).

If the SYN flag is ON (step S1603: YES), the testing apparatus 100 acquires the transmission source IP address (step S1604), and judges whether the address block of the transmission source IP address has been registered (step S1605). If the address block has not been registered (step S1605: NO), the testing apparatus 100 registers the address block of the transmission source IP address (step S1606). After registration, the testing apparatus 100 acquires the next packet data from the captured data (step S1607), and transitions to the process at step S1602.

If the SYN flag is OFF (step S1603: NO) or if the address block has been registered (step S1605: YES), the testing apparatus 100 transitions to the process at step S1607. If all of the packet data has been processed and no packet data is acquired (step S1602: NO), the testing apparatus 100 executes address block selection processing (step S1608), and ends the address block registration processing. The address block selection processing executes the registered address blocks as an argument. The address block selection processing is described in detail with reference to FIG. 17.

Figure 17:
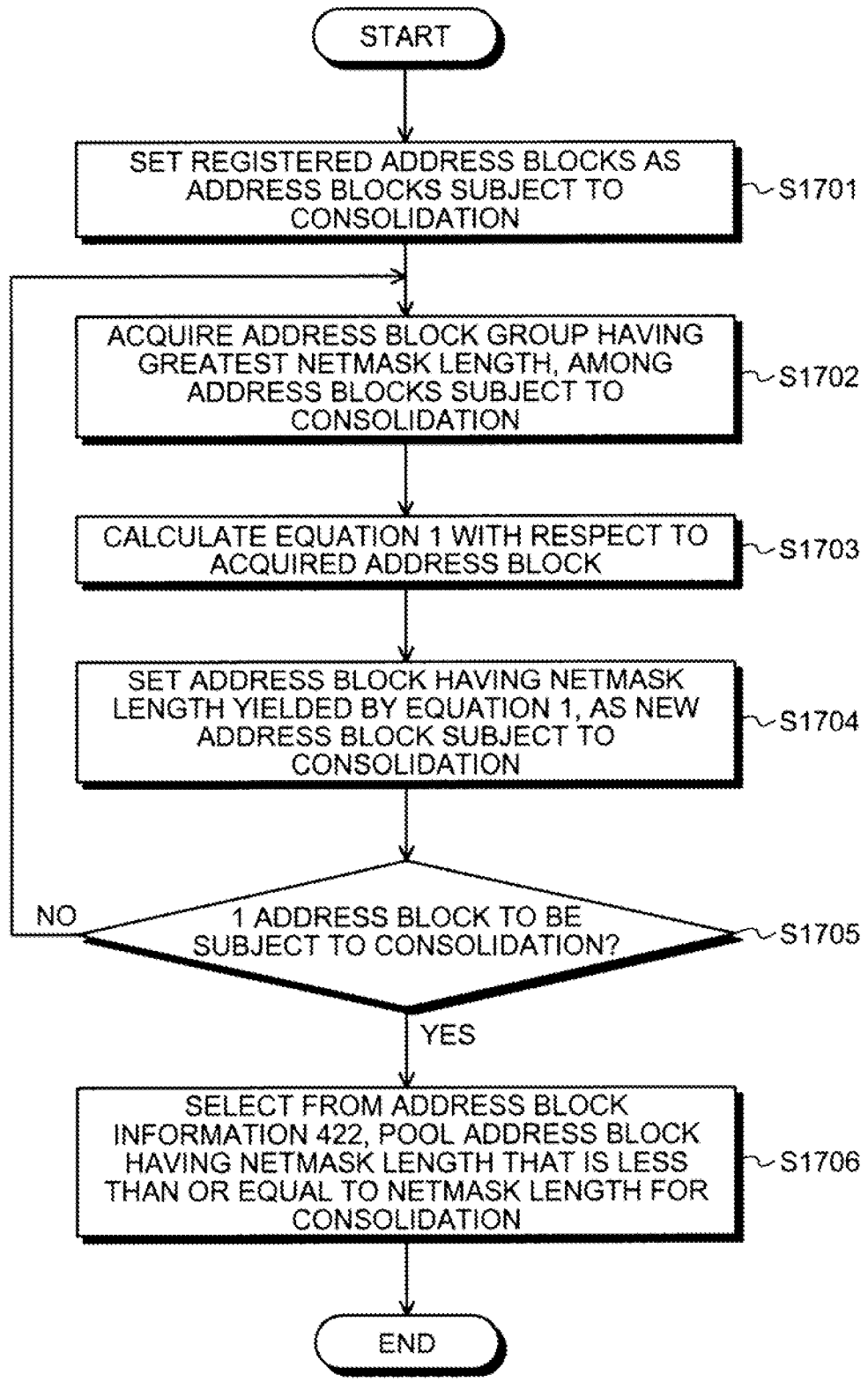
FIG. 17 is a flowchart depicting an example of address block selection processing.

FIG. 17 is a flowchart depicting an example of the address block selection processing. The address block selection processing involves consolidating the address blocks and selecting the address block information 422, an address block that can be included next in the consolidated address block.

The testing apparatus 100 sets the registered address blocks as address blocks subject to consolidation (step S1701). The testing apparatus 100 acquires the address block group having the greatest netmask length, among the address blocks subject to consolidation (step S1702). The testing apparatus 100 calculates equation 1 with respect to the acquired address block (step S1703). After calculation, the testing apparatus 100 sets the address block having the netmask length yielded by equation 1, as a new address block subject to consolidation (step S1704).

The testing apparatus 100 judges whether 1 address block is to be subject to consolidation (step S1705). If multiple address blocks are subject to consolidation (step S1705: NO), the testing apparatus 100 transitions to the process at step S1702. If 1 address block is to be subject to consolidation (step S1705: YES), the testing apparatus 100 selects from the address block information 422, a pool address block having a netmask length that is less than or equal to the netmask length for consolidation (step S1706). The testing apparatus 100 may select from the address block information 422, the address block having the greatest netmask length that is less than or equal to the netmask length for consolidation netmask length. After selection, the testing apparatus 100 ends the address block selection processing.

Figure 18:
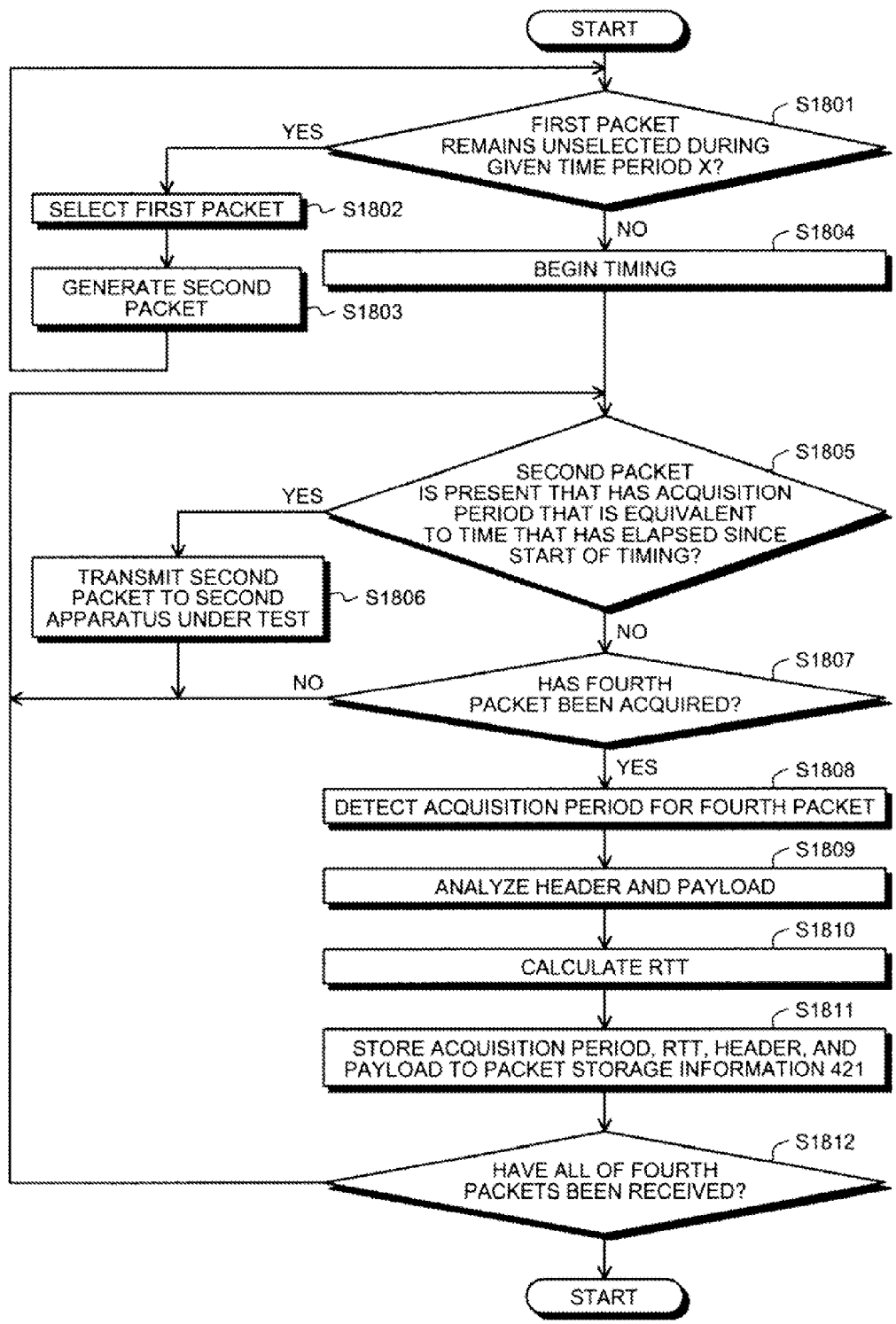
FIG. 18 is a flowchart depicting an example of packet conversion and transmission processing.

FIG. 18 is a flowchart depicting an example of packet conversion and transmission processing. The testing apparatus 100 judges whether among the packet storage information 421, a first packet (the record thereof) remains unselected during a given time period X (step S1801). If an unselected first packet is present (step S1801: YES), the testing apparatus 100 selects an unselected first packet (step S1802). The testing apparatus 100 generates a second packet from the selected first packet, via the generating unit 404 and stores the generated second packet to the packet storage information 421 (step S1803), and returns to step S1801.

At step S1801, if no unselected first packet is present (step S1801: NO), the testing apparatus 100 begins timing (step S1804), and judges whether a second packet is present that has an acquisition period that is equivalent to the time that has elapsed since the start of timing (the start of testing of the second apparatus under test) (step S1805). If a second packet having an equivalent acquisition period is present (step S1805: YES), the testing apparatus 100 transmits the second packet to the second apparatus under test (step S1806), and returns to step S1805.

At step S1805, if no second packet having an acquisition period equivalent to the current elapsed time is present (step S1805: NO), the testing apparatus 100 judges whether a fourth packet has been acquired (captured) (step S1807). If no fourth packet has been acquired (step S1807: NO), the testing apparatus 100 returns to step S1805.

If a fourth packet has been acquired (step S1807: YES), the testing apparatus 100 detects the acquisition period from the start of the test of the second apparatus under test until the time when the packet (the fourth packet) was captured (step S1808), and analyzes the header and the payload (step S1809). The testing apparatus 100 calculates the RTT by subtracting from the acquisition period of the fourth packet, the acquisition period of the corresponding second packet (step S1810).

The testing apparatus 100 stores the acquisition period, the RTT, the header, and the payload to the packet storage information 421 (step S1811), and judges whether all of the fourth packets have been received (step S1812). For example, the testing apparatus 100 judges whether the RTT has been calculated using the corresponding second packet.

If not all of the fourth packets have been received (step S1812: NO), the testing apparatus 100 returns to step S1805. On the other hand, if all of the fourth packets have been received (step S1812: YES), the testing apparatus 100 ends the packet conversion and transmission processing. Thus, the second and the fourth packet become stored to the packet storage information 421 as depicted in FIG. 5.

Figure 19:
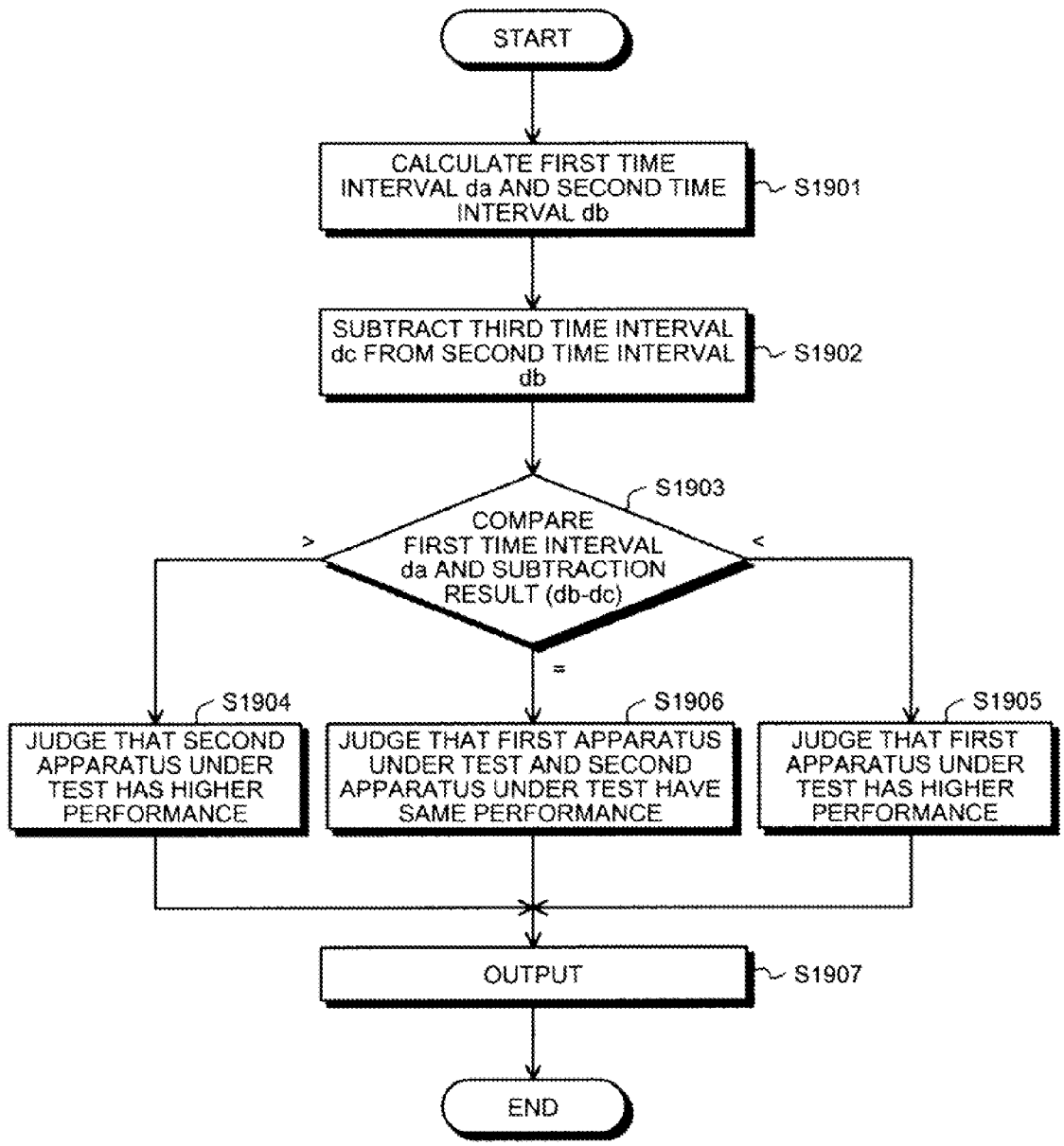
FIG. 19 is a flowchart depicting an example of comparative performance evaluation processing for first and second apparatuses under test.

FIG. 19 is a flowchart depicting an example of comparative performance evaluation processing for the first and the second apparatuses under test. The testing apparatus 100 calculates the first time interval da and second time interval db (step S1901), and subtracts from the second time interval db, the third time interval dc (step S1902). The testing apparatus 100 compares the first time interval da and the subtraction result (db−dc) (step S1903).

If da>db−dc is true (step S1903: >), the testing apparatus 100 judges that the second apparatus under test has higher performance (step S1904), and transitions to the process at step S1907. If da<db−dc is true (step S1903: <), the testing apparatus 100 judges that the first apparatus under test has higher performance (step S1905), and transitions to the process at step S1907.

In the case of da=db−dc (step S1903: =), the testing apparatus 100 judges that the first apparatus under test and the second apparatus under test have the same performance (step S1906), and transitions to the process at step S1907. At step S1907, the testing apparatus 100 outputs the judgment results obtained at step S1904 to step S1906 (step S1907).

Thus, since differences between the RTT of the first apparatus under test and the second apparatus under test can be disregarded, the test period can be reduced without the test engineer having to move. Further, the testing apparatus 100 can quickly and accurately evaluate the performance of an apparatus under test.

Figure 20:
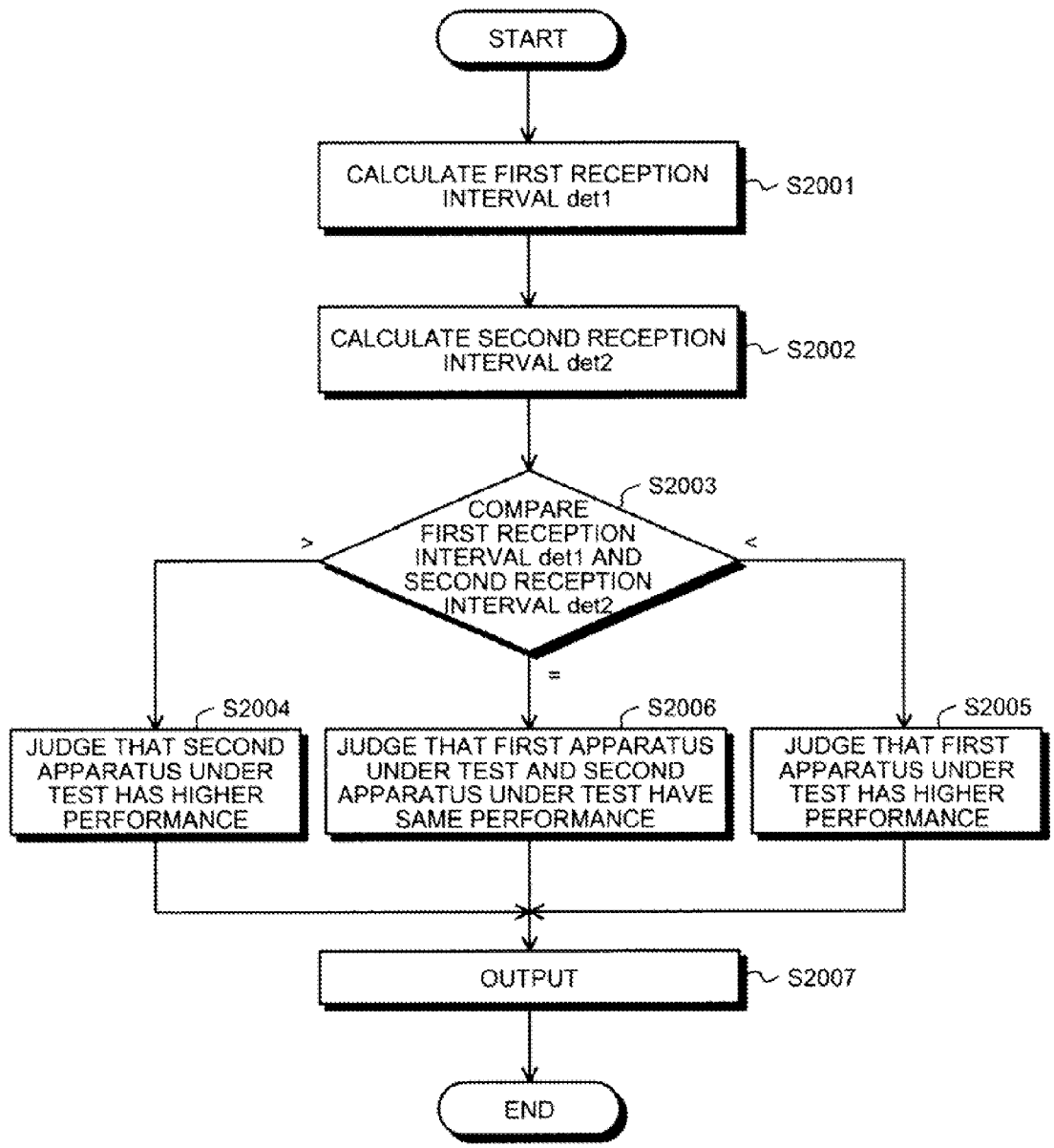
FIG. 20 is a flowchart depicting another example of the comparative performance evaluation processing for the first and the second apparatuses under test.

FIG. 20 is a flowchart depicting another example of the comparative performance evaluation processing for the first and the second apparatuses under test. The testing apparatus 100 calculates the first reception interval det1 (step S2001), and calculates the second reception interval det2 (step S2002). The testing apparatus 100 compares the first reception interval det1 and the second reception interval det2 (step S2003).

If det1>det2 is true (step S2003: >), the testing apparatus 100 judges that the second apparatus under test has higher performance (step S2004), and transitions to the process at step S2007. If det1<det2 is true (step S2003: <), the testing apparatus 100 judges that the first apparatus under test has higher performance (step S2005), and transitions to the process at step S2007.

In the case of det1=det2 (step S2003:=), the testing apparatus 100 judges that the first apparatus under test and the second apparatus under test have the same performance (step S2006), and transitions to the process at step S2007. At step S2007, the testing apparatus 100 outputs the judgment results obtained at step S2004 to step S2006 (step S2007).

Thus, in the comparative performance evaluation processing depicted in FIG. 20, even if the RTT between the operative server A and the verification server B is unknown, the testing apparatus 100 can evaluate performance.

Figure 21:
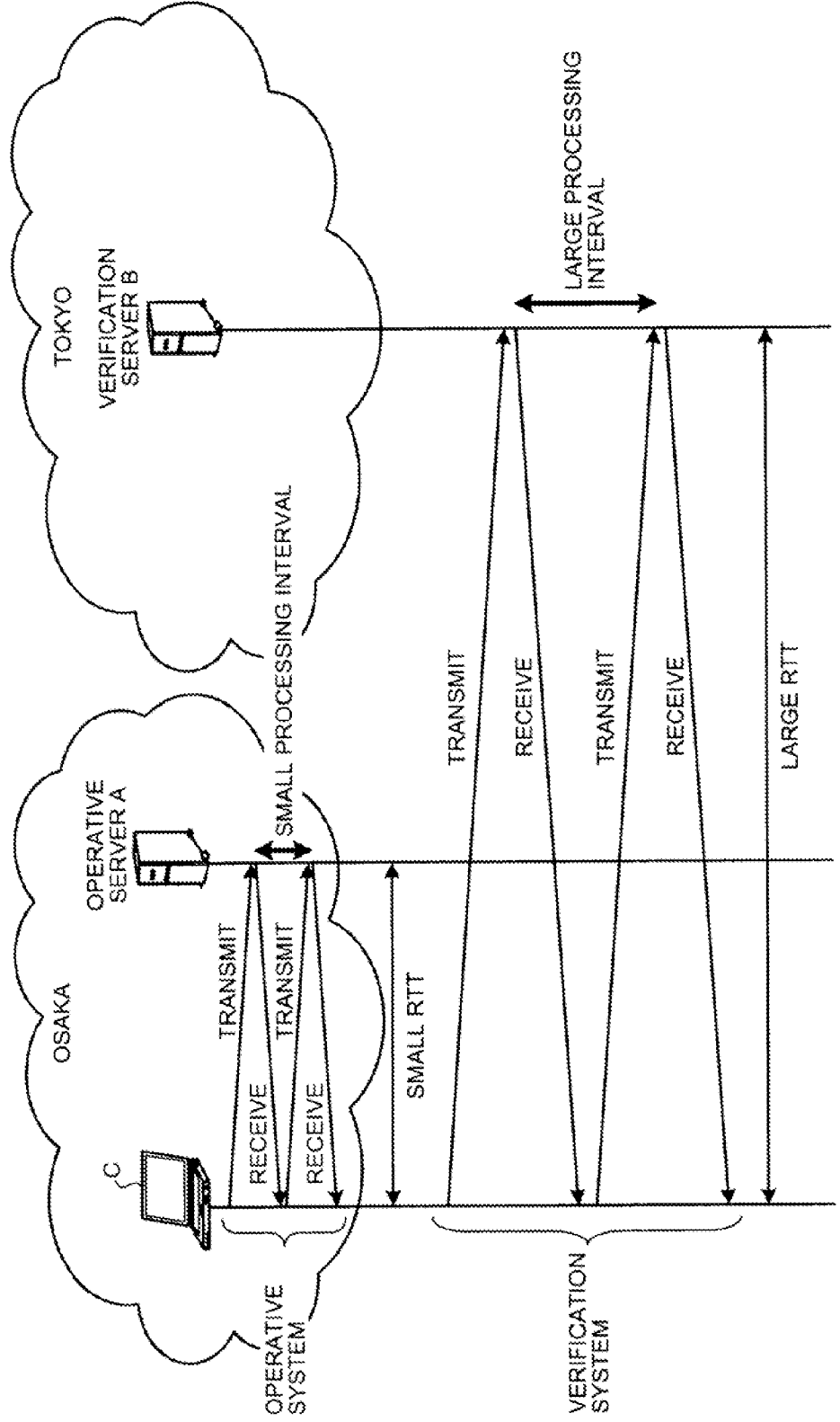
FIG. 21 is a diagram depicting an example of comparative performance evaluation processing for a conventional operative server and verification server.

FIG. 21 is a diagram depicting an example of comparative performance evaluation processing for a conventional operative server and verification server. In FIG. 21, the operative server A and the testing terminal C are assumed to be located in Osaka and the verification server B is assumed to be located in Tokyo. The operative server A, for example, is an operative computer that is in operation on the current system. The verification server B is a computer to which processing is planned to be switched from the operative server A. In this case, when the test engineer performs a test using the same pattern (a packet and the response packet thereof), the testing terminal C captures packets from the operative server A and sends the captured packets to the verification server B, in the same sequence pattern as that of the operative server A.

Figure 22:
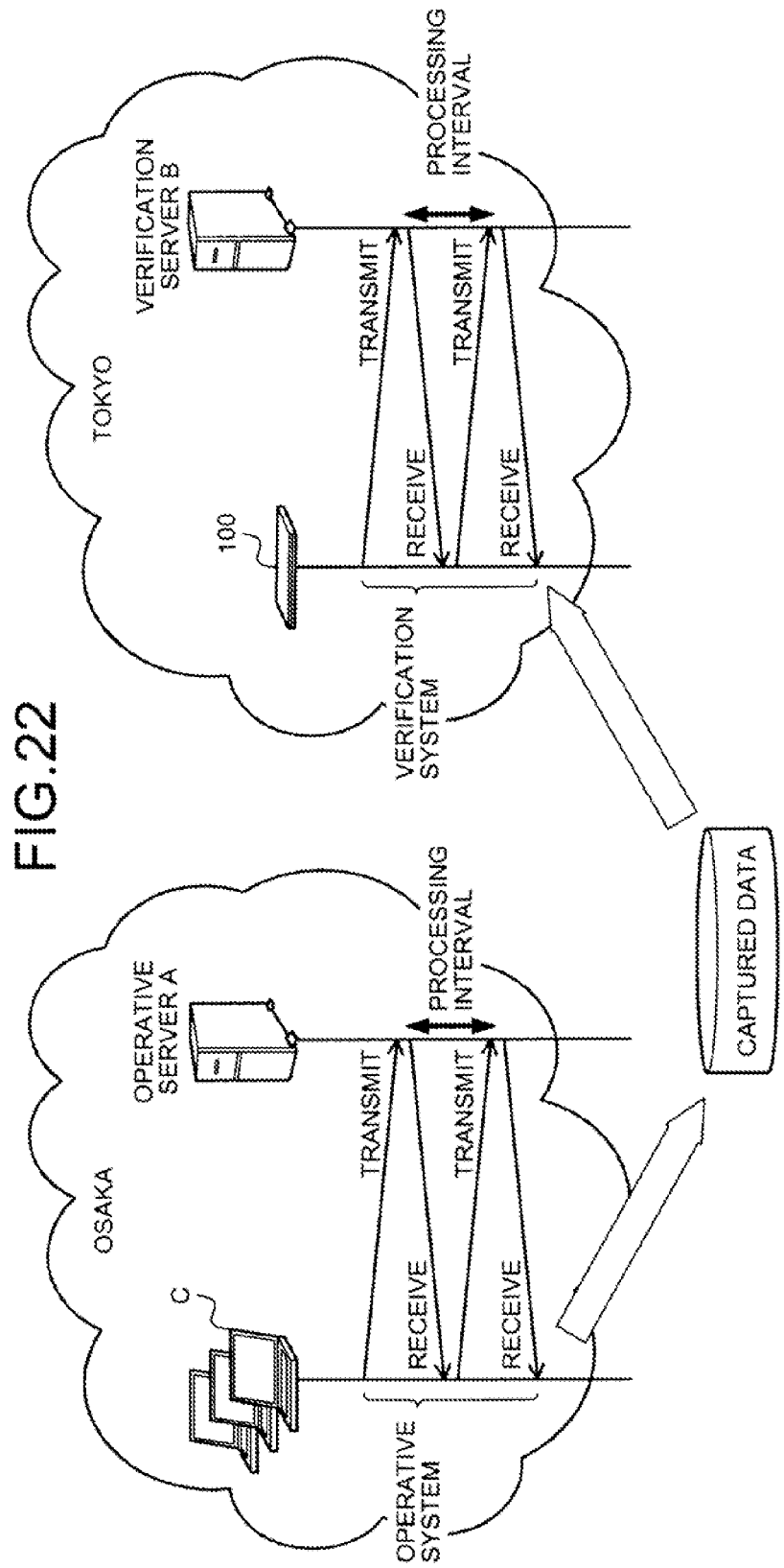
FIG. 22 is a diagram depicting another example of comparative performance evaluation processing for a conventional operative server and verification server.

FIG. 22 is a diagram depicting another example of comparative performance evaluation processing for a conventional operative server and verification server. The operative server A is, for example, an operative computer that is in operation on the current system. The verification server B is a computer that verifies the performance of the operative server A. In this case, when the test engineer performs a test using the same pattern (a packet and the response packet thereof), packets exchanged between the testing terminal C and the operative server A are captured and sent to the verification server B in the same sequence pattern as that of the operative server A.

As described, the computer product, the testing apparatus, and the testing method use, for verification, an address block that has a netmask length that is less than or equal to a value calculated from the netmask length of an operative address block group, whereby the testing apparatus is able to convert all of the operative addresses into verification addresses and execute testing.

Testing apparatus may select from among unselected address block groups, the address block having the greatest netmask length that is less than or equal to the calculated netmask length. Thus, the testing apparatus can select the most suitable address block, eliminating the securing of meaninglessly large address blocks. In particular, since address blocks of a large number of addresses are few and valuable, the address blocks can be used effectively.

The testing apparatus may calculate the netmask length of an address block using equation 1, whereby the testing apparatus can select an address block for which pre-verification testing is possible and calculate the netmask length by fewer calculations.

In the testing apparatus 100 according to the first embodiment, an optimal address block pool is selected based on address block size and block count. In the testing apparatus 100 according to a second embodiment, an optimal pool address block is selected based on the number of IP addresses in use in an address block. The hardware of the testing apparatus 100 according to the second embodiment is identical to that of the testing apparatus 100 according to the first embodiment and description thereof will be omitted. Further, functions of the testing apparatus 100 according to the second embodiment are also identical with the exception of the calculating unit 414 and redundant description will be omitted.

The calculating unit 414 according to the second embodiment has a function of calculating the value of the IP address bit count less the binary logarithmic value (rounded up) of the number of address in the first address group. The calculation method will be described with reference to FIG. 23 hereinafter. Calculated results are stored to the RAM 303, the magnetic disk 305, the optical disk 307, etc.

Figure 23:
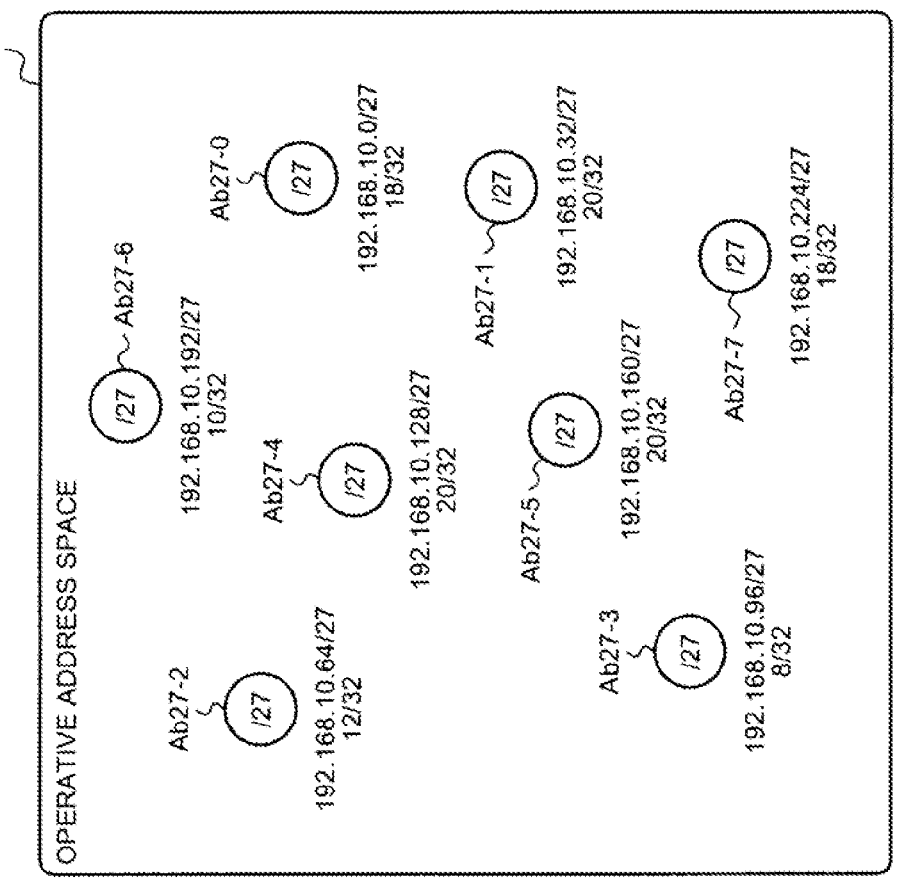
FIG. 23 is a diagram depicting an example of the IP address conversion method according to a second embodiment.

FIG. 23 is a diagram depicting an example of the IP address conversion method according to the second embodiment. In the operative address space 101, the testing apparatus 100 counts the number of IP addresses in use in the address block Ab27-0 to the address block Ab27-7. In the example depicted in FIG. 23, the testing apparatus 100 counts 18 addresses for the address block Ab27-0, 20 addresses for the address block Ab27-1, 12 addresses for the address block Ab27-2, and 8 addresses for the address block Ab27-3. The testing apparatus 100 further counts 20 addresses for the address block Ab27-4, 20 addresses for the address block Ab27-5, 10 addresses for the address block Ab27-6, and 18 addresses for the address block Ab27-7.

The testing apparatus 100 calculates the size of the pool address block using equation 2.

$$\text{IP address bit count} - \text{ROUNDUP}(\log_2(\text{in-use IP address count}+2)) \quad (2)$$

The IP address bit count is 32 in the case of IPv4, and 128 in the case of IPv6. With consideration of the network address and the broadcast address that are not assignable to the host and included in the address block, 2 is added to the number of IP addresses in use. In the example depicted in FIG. 23, the testing apparatus 100 calculates the netmask length of a pool address block that can be implemented by verification testing, using equation 2 as follows.

$$32 - \text{ROUNDUP}(\log_2((18+20+12+8+20+20+10+18)+2)) = 32-7=25$$

Therefore, the testing apparatus 100 selects from the pool address block group, the address block 10.10.21.0/25 (hereinafter, address block Bb25) having a netmask length of 25. Thus, the pool address block selection method according to the second embodiment is a particularly effective method when a large number of unassigned addresses are in the address space. For example, when the testing apparatus 100 performs the selection method according to the first embodiment, the netmask length for the pool address block is calculated as 24 by substituting netmask length=27 and address block count=8 into equation 1. Thus, in comparing the selection methods of the first embodiment and the second embodiment, the selection method according to the second embodiment improves the efficiency of address utilization by 2-fold.

FIG. 24 is a diagram depicting an example of the IP address correspondence information 423 according to the second embodiment. The IP address correspondence information 423-1 depicted in FIG. 24 is an example of the IP address correspondence information 423 when according to the selection method of the first embodiment, the address block Bb24 has been selected as the pool address block. The IP address correspondence information 423-2 is an example of the IP address correspondence information 423 when according to the selection method of the second embodiment, the address block Bb25 is selected as the pool address block.

The IP address correspondence information 423-1 indicates correspondences where operative IP addresses 192.168.10.X are converted to 10.10.20.X. For example, 10.10.20.1 to 10.10.20.18 correspond to the in-use IP addresses 192.168.10.1 to 192.168.10.18 of the address block Ab27-0, where 10.10.20.19 to 10.10.20.32 are not used. Further, 10.10.20.33 to 10.10.20.52 correspond to the in-use IP addresses 192.168.10.33 to 192.168.10.52 of the address block Ab27-1, where 10.10.20.53 to 10.10.20.64 are not used.

Additionally, 10.10.20.225 to 10.10.20.242 correspond to the in-use IP addresses 192.168.10.225 to 192.168.10.242 of the address block Ab27-7, where 10.10.20.243 to 10.10.20.254 are not used. Thus, in the IP address correspondence information 423-1, when a large number of unassigned IP addresses are in the operative address space, a large number of unused IP addresses are in the selected pool address block.

The IP address correspondence information 423-2 indicates correspondences where conversion is performed so that as few as possible unassigned addresses are present. For example, 10.10.21.1 to 10.10.21.18 correspond to the in-use IP addresses 192.168.10.1 to 192.168.10.18 in the address block Ab27-0; 10.10.21.19 to 10.10.21.38 correspond to the in-use IP addresses 192.168.10.33 to 192.168.10.52 of the address block Ab27-1; 10.10.21.109 to 10.10.21.126 correspond to the in-use IP addresses 192.168.10.225 to 192.168.10.242 in the address block Ab27-1.

Figure 25:
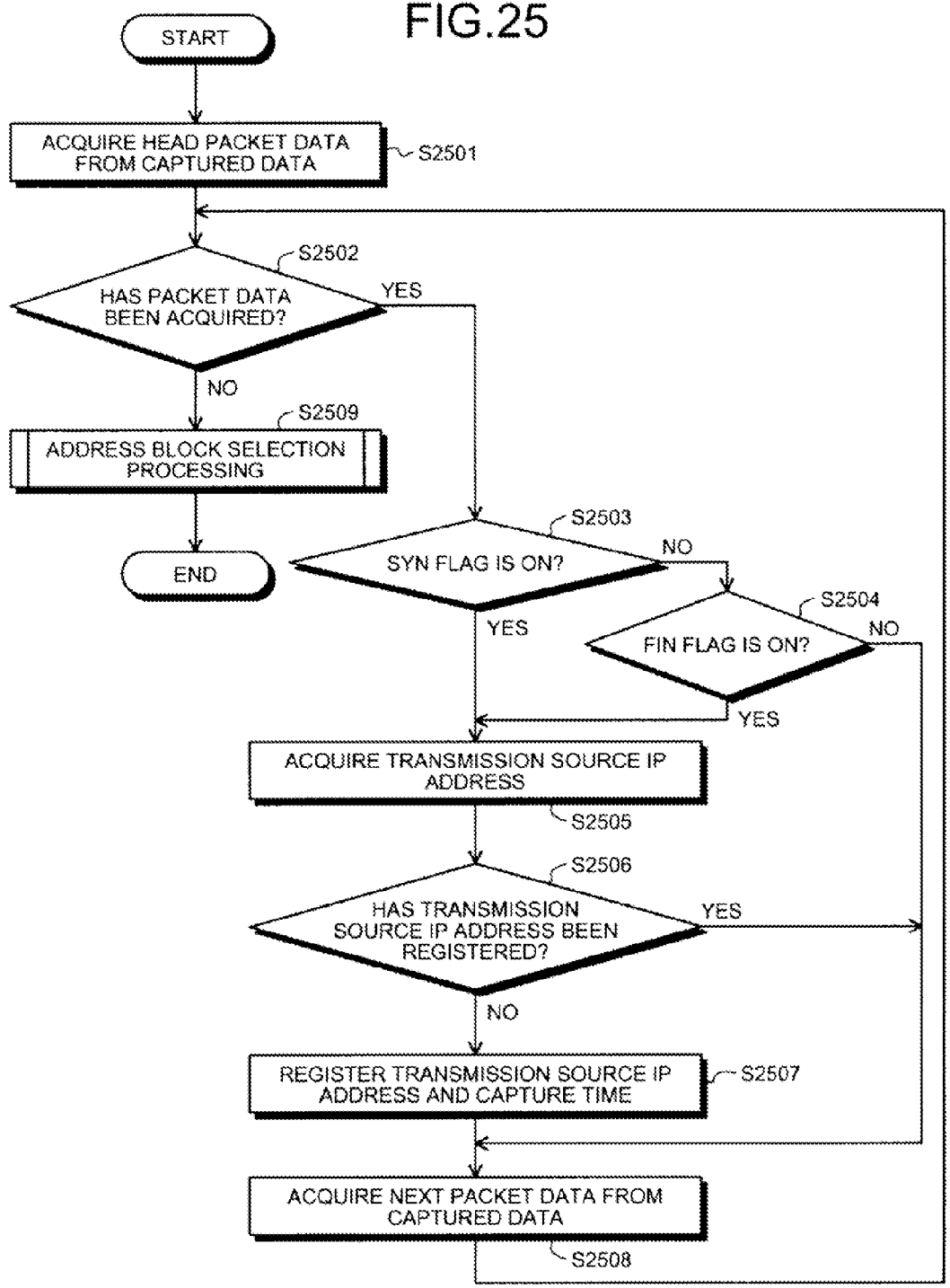
FIG. 25 is a flowchart depicting an example of the address block registration processing according to the second embodiment.

FIG. 25 is a flowchart depicting an example of the address block registration processing according to the second embodiment. In the address block registration processing according to the second embodiment, the processes at step S2501 to step S2503 are equivalent to the processes at step S1601 to step S1603 and description thereof is omitted.

If the SYN flag is OFF (step S2503: NO), the testing apparatus 100 judges whether the FIN flag is ON (step S2504). If the SYN flag is ON (step S2503: YES), or if the FIN flag is ON (step S2504: YES), the testing apparatus 100 acquires the transmission source IP address (step S2505). After acquisition, the testing apparatus 100 judges whether the transmission source IP address has been registered (step S2506).

If the address has not been registered (step S2506: NO), the testing apparatus 100 registers the transmission source IP address and the capture time (step S2507). After registration at step S2507, or if the address has been registered (step S2506: YES), or if the FIN flag is not ON (step S2504: NO), the testing apparatus 100 reads in the next packet data from the captured data (step S2508), and transitions to the process at step S2502.

Processing is performed with respect to all of the packet data and if packet data is not acquired (step S2502: NO), the testing apparatus 100 executes the address block selection processing according to the second embodiment (step S2509), and ends the address block registration processing. The address block selection processing is executed using the registered transmission source IP addresses as an argument. Details of the address block selection processing according to the second embodiment will be described hereinafter with FIG. 26.

Figure 26:
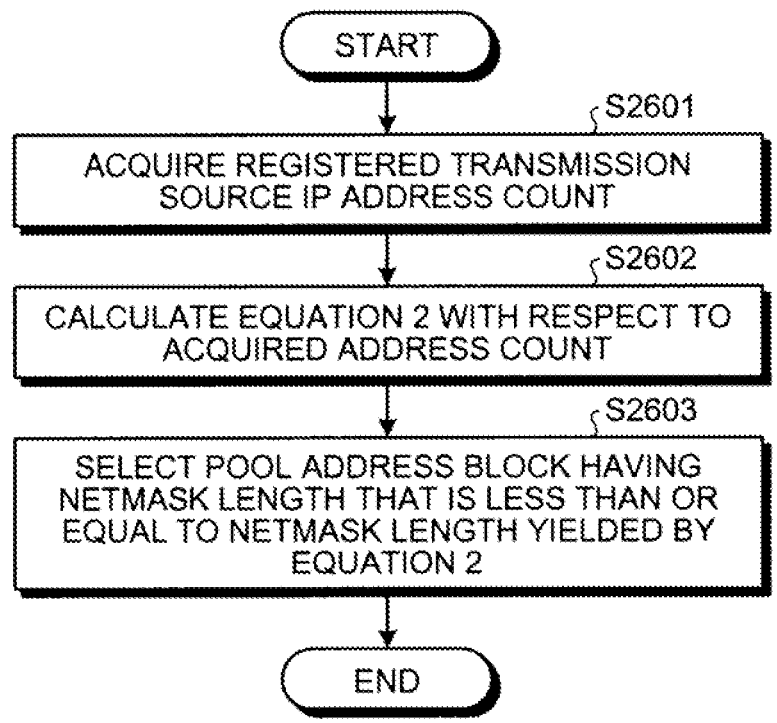
FIG. 26 is a flowchart depicting an example of the address block selection processing according to the second embodiment.

FIG. 26 is a flowchart depicting an example of the address block selection processing according to the second embodiment. The testing apparatus 100 acquires the registered transmission source IP address count (step S2601). The testing apparatus 100 calculates equation 2 with respect to the acquired address count (step S2602). The testing apparatus 100 selects a pool address block having a netmask length that is less than or equal to the netmask length yielded by equation 2 (step S2603), and ends the address block selection processing.

As described, the computer product, the testing apparatus, and the testing method may calculate the address block netmask length by equation 2. As a result, when a large number of unassigned addresses are in the operative address space, a smaller address block can be selected.

The testing apparatus 100 according to the second embodiment selects an optimal pool address block, based on the number of IP addresses in-use in the address block. The testing apparatus 100 according to a third embodiment selects an optimal pool address block, according to temporal changes of the IP address in use. The hardware of the testing apparatus 100 according to the third embodiment is identical to that of the testing apparatus 100 according to the first embodiment and description thereof is omitted. Functions of the testing apparatus 100 according to the third embodiment are identical as well with the exception of the calculating unit 414 and redundant description is omitted.

The calculating unit 414 according to the third embodiment has a function of calculating the value of the IP address bit count less the binary logarithmic value (rounded up) of the largest number of addresses simultaneously used in the first address group. The calculation method will be described with reference to FIG. 27 to FIG. 29 hereinafter. Calculated results are stored to the RAM 303, the magnetic disk 305, the optical disk 307, etc.

FIG. 27 is a diagram depicting an example of IP address correspondence information 2701 according to the third embodiment. The IP address correspondence information 2701 depicted in FIG. 27 includes record 2701-1 to record 2701-4. The IP address correspondence information 2701, in addition to the IP address correspondence information 423, has a session commencement time field and a session completion time field. The information indicated by the fields present in the IP address correspondence information 423 is similar to that described above and description thereof is omitted. The session commencement time field indicates the time when a session started and is the time when the SYN flag changed to ON. The session completion time field is the time when the session ended and is the time when the FIN flag changed to ON.

In the example depicted in FIG. 27, the record 2701-3 indicates that the session continues from 0.0[seconds] to 7.7 [seconds] and the record 2701-4 indicates that the session continued from 8.0[seconds] to 8.6[seconds].

With reference to FIG. 28 and FIG. 29 and example of address conversion according to temporal changes of the IP address correspondence information 2701 will be described. As depicted in FIG. 28, when communication periods do not overlap, the testing apparatus 100 sets the same pool-address-block address. As depicted in FIG. 29, even when communication periods do not overlap, the time that elapses from the previous session may shorter than a given period and if another session is established, the testing apparatus 100 performs an operation of converting by a different address. In FIG. 28 and FIG. 29, a symbol "−x" appended to the tail of the IP address correspondence information 2701 indicates the state of the IP address correspondence information 2701 at the point in time of x seconds.

Further, in FIG. 28 and FIG. 29, 3 sessions are established (session X, session Y, session Z), where the commencement time of session X is defined as X1 and the completion time is defined as X2. Similarly, the commencement time of session Y is defined as Y1 and the completion time is defined as Y2; and the commencement time of session Z is defined as Z1 and the completion time is defined as Z2.

FIG. 28 is a diagram depicting an example of address conversion according to temporal changes of the IP address correspondence information 2701 according to the third embodiment. In FIG. 28, 0, X1, Y1, X2, Z1, Y2, and Z2 indicate sequential points in time. The IP address correspondence information 2701-0 at time 0 indicates that 10.10.20.2 and 10.10.20.3 are not used.

At time X1, session X is assumed to be established. At this time, the testing apparatus 100 sets 10.10.20.2 to be "in-use" as indicated by the IP address correspondence information 2701-1-X1. At time Y1 before the release of session X, another session (session Y) is established. At this time, the testing apparatus 100 sets 10.10.20.3 to be "in-use" as indicated by the IP address correspondence information 2701-1-Y1. At time X2, upon release of session X, the testing apparatus 100 releases 10.10.20.2 as indicated by the IP address correspondence information 2701-1-X2.

At time Z1, upon establishment of session Z, since 10.10.20.2 is available, the testing apparatus 100 sets 10.10.20.2 and not 10.10.20.4 to be "in-use" as indicated by the IP address correspondence information 2701-1-Z1. At time Y2 when session Y is released, the testing apparatus 100 sets 10.10.20.3 to be released as indicated by the IP address correspondence information 2701-1-Y2. At time Z2 when session Z is released, the testing apparatus 100 sets 10.10.20.2 to be released as indicated by the IP address correspondence information 2701-1-Z2. Thus, the address conversion method depicted in FIG. 28 can anticipate address block consolidation the more the communication period is dispersed.

FIG. 29 is a diagram depicting an example of address conversion according to temporal changes of the IP address correspondence information 2701 according to the third embodiment. In FIG. 29, 0, X1, X2, Y1, Y2, Z1, and Z2 indicate sequential points in time. The IP address correspondence information 2701-0 at time 0 indicates that 10.10.20.2 and 10.10.20.3 are not used.

At time X1, session X is assumed to be established. At this time, the testing apparatus 100 sets 10.10.20.2 to be "in-use" as indicated by the IP address correspondence information 2701-2-X1. At X2 when session X is released, the testing apparatus 100 releases 10.10.20.2 as indicated by the IP address correspondence information 2701-2-X2.

At Y1 when session Y is established, the testing apparatus 100 judges that |Y1-X2|<threshold is true and sets 10.10.20.3 (not 10.10.20.2) to be "in-use" as indicated by the IP address correspondence information 2701-2-Y1. At time Y2 when session Y is released, the testing apparatus 100 releases 10.10.20.3 as indicated by the IP address correspondence information 2701-2-Y2.

At time Z1 when session Z is established, the testing apparatus 100 judges that |Z1-X2|≥threshold is true and sets 10.10.20.2 to be "in-use" as indicated by the IP address correspondence information 2701-2-Z1. At time Z2 when session Z is released, the testing apparatus 100 releases 10.10.20.3 as indicated by the IP address correspondence information 2701-2-Z2.

Thus, conversion is not to the same transmission source IP address during a time interval that is shorter than a given period, whereby the verification server can prevent misjudging a subsequent session to be the information of the previous session.

With the exception of the address block selection processing, the processing flow according to the third embodiment is identical to that of the second embodiment and redundant description is omitted. With reference to FIG. 30, the address block selection processing according to the third embodiment will be described.

FIG. 30 is a flowchart depicting an example of the address block selection processing according to the third embodiment. The testing apparatus 100 sets the in-use IP address count n to 0 (step S3001), sets the maximum in-use IP address count n_max to 0 (step S3002), and sets the time t to 0 (step S3003). Here, n, n_max, and t are variables.

After the setting, the testing apparatus 100 searches among the registered transmission source IP addresses, for a transmission source IP address having the earliest session commencement time or session completion time after time t (step S3004). After the search, the testing apparatus 100 judges whether a transmission source IP address could be found (step S3005). If a transmission source IP address could be found (step S3005: YES), the testing apparatus 100 judges whether the earliest time is the session commencement time (step S3006).

If the earliest time is the session commencement time (step S3006: YES), the testing apparatus 100 increments n (step S3007) and judges whether n>n_max is true (step S3008). If n>n_max is true (step S3008: YES), the testing apparatus 100 sets n to n_max (step S3009).

When the session completion time arrives (step S3006: NO), the testing apparatus 100 decrements n (step S3010). After step S3009, step S3010, or step S3008: NO, the testing apparatus 100 sets time t as the time when the transmission source IP address was found (step S3011), and transitions to the process at step S3004. If no transmission source IP address is found (step S3005: NO), the testing apparatus 100 calculates equation 2 using n_max as the acquired address count (step S3012). After calculation, the testing apparatus 100 selects a pool address block having a netmask length that is less than or equal to the netmask length yielded by equation 2 (step S3013), and ends the address block selection processing.

By executing the operations depicted in the flowchart of FIG. 30, the testing apparatus 100 can acquire the maximum number of addresses that can be used simultaneously when the operations depicted in FIG. 28 are performed. At step S3004, in place of the session completion time, processing can be performed using the sum of the session completion time and a threshold, whereby the testing apparatus 100 can perform the operations depicted in FIG. 29.

As described, the computer product, the testing apparatus, and the testing method may calculate as the netmask length, the IP address bit count less the binary logarithmic value (rounded up) of the maximum number of operative addresses that can be used simultaneously. Consequently, the testing apparatus can anticipate address block consolidation the more the communication period is dispersed.

The testing method described in the present embodiments may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

According to one aspect of the present invention, operative addresses can be converted to verification addresses and pre-verification testing can be executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing therein a testing program that causes a computer having a storage device storing therein netmask lengths and address block utilization information associated with address blocks, to execute a process, the process comprising:

acquiring first packets transmitted to a first apparatus, where first addresses are regarded as transmission sources;

referring to the storage device and acquiring a count of address blocks to which the first addresses belong and an address block netmask length;

calculating based on the acquired address block count and the acquired netmask length, the netmask length by subtracting a bit count according to the number of the first addresses from the netmask length;

referring to the storage device and selecting from among unused address blocks, an address block having a netmask length that is less than or equal to the calculated netmask length; and transmitting to a second apparatus, second packets obtained by setting the transmission sources of the first packets to second addresses in the selected address block.

2. The computer-readable medium according to claim 1, wherein the referring to the storage device and selecting from among the unused address blocks, includes selecting the address block having the greatest netmask length that is less than or equal to the calculated netmask length.

3. The computer-readable medium according to claim 1, wherein the calculating of the netmask length includes calculating the address block netmask length by subtracting a binary logarithmic value (rounded up) of the acquired address block count from the address block netmask length, and referring to the storage device and selecting from among the unused address blocks, includes selecting the address block having a netmask length that is less than or equal to the calculated netmask length.

4. The computer-readable medium according to claim 1, wherein the calculating of the netmask length includes calculating the IP address bit count by subtracting a binary logarithmic value (rounded up) of the number of the first addresses from the IP address bit count.

5. The computer-readable medium according to claim 1, wherein the calculating of the netmask length includes calculating the IP address bit count by subtracting a binary logarithmic value (rounded up) of the largest number of the first addresses simultaneously used from the IP address bit count.

6. A testing apparatus comprising:

a storage device storing therein netmask lengths and address block utilization information associated with address blocks; and a processor configured to acquire first packets transmitted to a first apparatus, where first addresses are regarded as transmission sources, refer to the storage device and acquire a count of address blocks to which the first addresses belong and an address block netmask length, calculate the netmask length by subtracting a bit count according to the number of first addresses from the netmask length, based on the acquired address block count and the acquired netmask length, refer to the storage device and select from among unused address blocks, an address block having a netmask length that is less than or equal to the calculated netmask length, and transmit to a second apparatus, second packets obtained by setting the transmission sources of the first packets to second addresses in the selected address block.

7. A testing method executed by a computer having a storage device storing therein netmask lengths and address block utilization information associated with address blocks, the testing method comprising:

acquiring first packets transmitted to a first apparatus, where first addresses are regarded as transmission sources;

referring to the storage device and acquiring a count of address blocks to which the first addresses belong and an address block netmask length;

calculating based on the acquired address block count and the acquired netmask length, the netmask length by subtracting a bit count according to the number of the first addresses from the netmask length;

referring to the storage device and selecting from among unused address blocks, an address block having a netmask length that is less than or equal to the calculated netmask length; and transmitting to a second apparatus, second packets obtained by setting the transmission sources of the first packets to second addresses in the selected address block.

* * * * *